(12) United States Patent  
Nakayama

(10) Patent No.: US 6,198,754 B1
(45) Date of Patent: Mar. 6, 2001

(54) NETWORK SYSTEM, TRANSMITTING DEVICE AND RECEIVING DEVICE

(75) Inventor: Mikio Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/025,515

(22) Filed: Feb. 18, 1998

(30) Foreign Application Priority Data

Aug. 11, 1997  (JP) .................................................. 9-216854

(51) Int. Cl.[7] ................................. H04J 3/04; H04J 3/22
(52) U.S. Cl. .......................................... 370/536; 370/544
(58) Field of Search ................................. 370/395, 394, 370/465, 468, 530, 536, 537, 538, 540, 542, 413, 414–419

(56) References Cited

U.S. PATENT DOCUMENTS

| 5,099,475 | * | 3/1992 | Kozaki et al. | 370/422 |
| 5,113,392 | * | 5/1992 | Takiyasu et al. | 370/472 |
| 5,121,384 | * | 6/1992 | Ozeki et al. | 370/400 |
| 5,386,415 | * | 1/1995 | Ito et al. | 370/394 |
| 6,031,838 | * | 2/2000 | Okabe et al. | 370/395 |
| 6,034,954 | * | 3/2000 | Takase et al. | 370/362 |

FOREIGN PATENT DOCUMENTS

| 2170743 | 7/1990 | (JP) . |
| 8186576 | 7/1996 | (JP) . |

* cited by examiner

Primary Examiner—David R. Vincent
(74) Attorney, Agent, or Firm—Helfgott & Karas, P.C.

(57) ABSTRACT

A transmitting device cyclically distributes a plurality of cells to a plurality of lines in a predetermined order. The transmitting unit loads the same cell block number into the cells to be distributed to the lines in the same cycle, and transmits the cells to the lines. A receiving device, whenever receiving the cells from the transmitting device via the lines, arranges the cells into which the same cell block number is loaded in the predetermined order.

11 Claims, 26 Drawing Sheets

NETWORK SYSTEM, TRANSMITTING DEVICE AND RECEIVING DEVICE

BACKGROUND OF THE INVENTION

The present invention relates to a network system, a transmitting device and a receiving device, which are used for transmitting a plurality of cells forming a broad band cell string generated in, e.g., a broad band rate network by use of a plurality of narrow band rate lines.

In a network using an ATM (Asynchronous Transfer Mode), if there exists no line having a capacity enough to transmit ATM cells (a broad band cell string) of a broad band cell rate, it is required that the broad band cell string be demultiplexed into narrow band cell strings corresponding to a plurality of low-speed lines and thus be transmitted. There is known a network system incorporating a line demultiplexing cell communication function. Herein, the line dividing the cell communicating function is defined as a function of demultiplexing the broad band cell string into a plurality of narrow band cell strings, and transmitting and receiving the respective narrow band cell strings.

As the network system incorporating the line demultiplexing cell communication function, for example, there exists (1) a network system including a band demultiplexer for demultiplexing a broad band cell string received via a high-speed UNI (User Network Interface) such as (1) OC3C etc into low-speed UNIs and thus transmitting these UNIs and a band multiplexer for generating a broad band cell string by multiplexing narrow band cell strings received from the low-speed UNIs, or (2) a network system including a low-speed line broad band device for generating the broad band cell string, allocating each of a plurality of cells forming this broad band cell string to a plurality of low-speed UNIs and thus transmitting the cells and a low-speed line broad band device for restoring the plurality of cells received via the plurality of low-speed UNIs into the broad band cell string and thus transmitting the broad band cell string.

FIG. 25 is a diagram illustrating an example of the network system including a band demultiplexer 5 and a band multiplexer 6. The network system shown in FIG. 25 is a network system in which a low-speed ATM network is connected as a relay network between high-speed ATM networks. Shown therein is such a construction that the data (cells) are transmitted from a left side to a right side on the sheet surface in FIG. 25.

Referring again to FIG. 25, each of the band demultiplexer 5 and the band multiplexer 6 is connected via the low-speed UNI to the low-speed ATM network 7 having a plurality of low-speed lines (three low-speed lines α1–α3 in FIG. 25). A customer premises Equipment (CPE) 2a to which data terminal equipments (DTES) 1a, 1b are respectively connected, is connected via the high UNI to the band demultiplexer 5. A CPE 2b to which DTEs 1c, 1d are respectively connected, is connected via the high UNI to the band multiplexer 6.

In the above-described network system, for example, the DTE 1a transmits the data to the DTE 1c, and the DTE 1b transmits the data to the DTE 1d. In this case, cells X1, X2, . . . , Xn stored with the data are transmitted from the DTE a to the DTE 1c defined as a transmitting destination. Cells Y1, Y2, . . . , Yn held with the data are transmitted from the DTE 1b to the DTE id defined as a transmitting destination.

Thereupon, the CPE 2a multiplexes the plurality of cells received from the DTE a, DTE 1b in order of being received, and transmits the cells to the band demultiplexer 5. At this time, the plurality of cells transmitted from the CPE 2a are form one broad band cell string having order of, e.g., the cell X1, the cell X2, the cell Y1, the cell Y2, The band demultiplexer 5, upon receiving the plurality of cells forming the above broad band cell string from the CPE 2a, cyclically allocates the respective cells to the low-speed lines α1–α3 in the order of being received. For instance, the band demultiplexer 5 transmits the cell X1 to the low-speed line α1, the cell X2 to the low-speed line α2, the cell Y1 to the low-speed line α3, and the cell Y2 to the low-speed line α1. With this transmission, the broad band cell string is demultiplexed into three narrow band cell strings transmitted via the low-speed lines α1–α3. The three narrow band cell strings thus formed are transferred to the band multiplexer 6 via the low-speed lines α1–α3.

The band multiplexer 6 receives the narrow band cell string via each of the low-speed lines α1–α3, and restores the previous broad band cell string by multiplexing these cell strings. That is, the band width multiplexer 6, upon receiving the plurality of cells forming the narrow band cell strings, forms the previous high-speed cell string therefrom and transfers the high-speed cell string to the CPE 2b.

The CPE 2b, when receiving the plurality of cells forming the broad band cell string from the band multiplexer 6, transfers the cells X1–Xn the DTE 1c in the order of being received from the band multiplexer 6 on the basis of connection address data (address data about of the transmitting destination) stored in each cell. Further, the CPE 2b transfers the cells Y1–Yn the DTE 1d in the order of being received from the band multiplexer 6. In this way, the DTE 1c receives the data transmitted from the DTE 1a, and the DTE 1d receives the data transmitted from the DTE 1c.

Incidentally, if a fluctuation of the cells in the low-speed ATM network 7 is 0, and if cell delay times are all the same, the broad band cell string is formed by use of the cells received cyclically by the band multiplexer 6 via the low-speed lines α1–α3 in the order of being received, in which case the broad band cell string is restored in the order (the cell X1, the cell X2, the cell Y1, the cell Y2, . . . ) of being transmitted from the band demultiplexer 5.

In reality, however, the cell delay time becomes different according to the low-speed lines α1–α3, and the cell fluctuation has a finite value. Therefore, the cells do not arrive at the band multiplexer 6 in the order of being transmitted from the band demultiplexer 5. Accordingly, when the band multiplexer 6 restores the broad band cell string in the order of receiving the cells, the cell order becomes different from the order of being transmitted from the DTE 1a or DTE 1b. In this case, the cells do not arrive at the DTE 1c or DTE 1d defined as a cell receiving equipment in an accurate order. Accordingly, it might happen that an error occurs in the data transmitted to the DTE 1c or DTE 1d.

To cope with this error, the band demultiplexer 5 has a transmitting unit 5a, while the band multiplexer 6 has a receiving unit 6a. Then, the transmitting unit 5a and the receiving unit 6a make the band multiplexer 6 generate the broad band cell string from the plurality of narrow band cell strings in a proper cell order. FIG. 26 is a diagram showing an example of operations of the band demultiplexer 5 (the transmitting unit 5a) and the band multiplexer 6 (the receiving unit 6a) illustrated in FIG. 25.

In order to generate the broad band cell string from the narrow band cell strings transmitted via the plurality of low-speed lines α1–α3 in the proper cell order, it is required that a delay in the low-speed ATM network 7 be known beforehand by the band multiplexer 6. Therefore, the transmitting unit 5a of the band demultiplexer 5 transmits training cells TR1–TR3 to the low-speed lines α1–α3 at the same timing. Then, the receiving unit 6a of the band multiplexer 6 measures a delay time of each of the low-speed lines α1–α3 from a receiving time of each of the training cells TR1–TR2.

The receiving unit 6a does not, however, grasp a transmitting time of each of the training cells TR1–TR3, and therefore measures a relative delay time (T1, T2, ... Tn: n=3 in the example shown in FIG. 26) on the basis of the receiving time of the training cell received at first among the training cells TR1–TR3.

Subsequently, the receiving unit 6a defines the relative delay time to be Tmax, of the training cell received latest among the training cells TR1–TR3. In the example shown in FIG. 26, the training cell TR2 is received latest, and hence a relative delay time T2 of this training cell TR2 becomes Tmax (T2=Tmax).

Thereafter, the band demultiplexer 5 demultiplexes the cells P1–P8 forming the broad band cell string into three narrow band cell strings (the cell string consisting of the cells P1, P4, P7, the cell string consisting of the cells P2, P5, P8, and the cell string consisting of the cells P3, P6), and transmits these cell strings respectively to the low-speed lines α1–α3. The receiving unit 6a, each time the band multiplexer 6 receives the cell via each of the low-speed lines α1–α3, adjusts the time by adding a fixed delay time (D1, D2, ... , Dn) the receiving time of each cell. Herein, the fixed delay time is a value (Di=Tmax–Ti, where i=1 to n) obtained by subtracting the relative delay time relative to each of the training cells TR1–TR3 from the maximum relative delay time Tmax, and is different according to the low-speed line α1–α3.

By this time adjustment, the cell order is modified from the receiving order of the band multiplexer 6 to the transmitting order of the band demultiplexer 5. FIG. 26 shows an example in which the cells P1–P3 transmitted in the order of α1, α2, α3 to the low-speed lines α1–α3 by the band demultiplexer 5 are received in the order of P1, P3, P2 by the band multiplexer 6 and modified to order of P1, P2, P3 by the receiving unit 6a.

Similarly, the order of the cells P4–P5 is also modified to the order of being transmitted from the band demultiplexer 5. Then, the band multiplexer 6 structures the broad band cell string consisting of the cells P1–P8 in the cell order after being modified, and transfers the same cell string to the CPE 2b.

There arise, however, the following problems inherent in the prior art network system explained above. Namely, in the prior art network system, the delay is adjusted per cell received by the band multiplexer 6. Therefore, before the broad band cell string is transmitted to the low-speed lines α1–α3, the band demultiplexer 5 must transmit the training cells TR1–TR2 to the band multiplexer 6. Accordingly, the procedures becomes troublesome.

Further, it might happen that characteristics within the low-speed ATM network 7 change during communications for a long time. In this case, the delay time in each of the low-speed lines α1–α3 also changes, and therefore the delay is unable to be properly adjusted in some cases depending on a result of measuring the delay time with respect to the training cells TR1–TR3.

Moreover, if the cell fluctuation within the low-speed ATM network 7 becomes larger than a cell interval in the broad band cell string, the order in the cell string can not be controlled.

SUMMARY OF THE INVENTION

It is a primary object of the present invention, which was contrived in view of the problems described above, to provide a network system, a transmitting device and a receiving device that are capable of arranging, in an adequate order, cells received respectively via a plurality of lines in spite of a cell delay and a cell fluctuation in each of the plurality of lines.

To accomplish the above object, the present invention adopts the following constructions. To be specific, according to a first aspect of the present invention, a network system comprises (1) a transmitting device, connected to a plurality of lines, cyclically distributing a plurality of cells to the lines in predetermined order, while loading a same cell block number into cells to be distributed to the lines in a same cycle, and (2) a receiving device, connected to the transmitting device via the lines, receiving the cells transmitted from the transmitting device via the lines, and arranging the cells having the same cell block number in the predetermined order.

According to the first aspect of the invention, the transmitting device cyclically distributes the plurality of cells to the plurality of lines in the predetermined order. Subsequently, the transmitting device loads the same cell block number into cells distributed to the plurality of lines in the same cycle. Then, the cells transmit to the receiving device via the lines. The receiving device, whenever receiving the plurality of cells transmitted by the transmitting unit via the lines, arranges the cells with which loaded the same cell block number in the predetermined order. Accordingly, the plurality of cells with which the same cell block number is loaded are arranged in the predetermined order. Namely, the plurality of cells transmitted from the transmitting device are arranged in the predetermined order without being influenced by a cell delay and a cell fluctuation in the low-speed network.

According to a second aspect of the present invention, there is provided of a network system comprising a first node connected to a first line and a plurality of second lines, having a generating unit generating data about order of cells constituting a cell string received from the first line, a setting unit loading the data generated by said generating unit into the cells and a distributing unit distributing the cells loaded with the data by said setting unit to the second lines and a second node connected to the first node via the second lines, connected to a third line, having a arranging unit generating one cell string by arranging the cells received from the first node via the second lines on the basis of the data and by multiplexing the cells and a transmitting unit transmitting the cell string generated by said arranging unit to the third line.

According to a third aspect of the present invention, there is provided a transmitting device connected via a plurality of lines to a receiving device which extracts cells having a same cell block number among a plurality of cells received via the lines from the transmittind device and arranges the cells in predetermined order, comprising a distributing unit cyclically distributing the plurality of cells to the lines in the predetermined order, and a loading unit loading a same cell block number into cells to be distributed to the lines in the same cycle.

According to a fourth aspect of the present invention, in a transmitting device according to the third aspect, the cell block number is loaded into a generic flow control area of a header of the cells.

According to a fifth aspect of the present invention, a transmitting device according to the third aspect further comprises a cell generating unit for generating the plurality of cells.

According to a sixth aspect of the present invention, in a transmitting device according to the third aspect, the distributing unit comprises a selector distributing the plurality of cells to the plurality of lines in accordance with a switching signal and a switching control unit cyclically supplying the selector with the switching signal, and wherein said loading unit comprises a block number generating unit generating the cell block number corresponding to the switching signal, and a block number adding unit receiving the cell block number from the block number generating unit and loading the same cell block number into cells to be distributed in the same cycle.

According to a seventh aspect of the present invention, there is provided a transmitting device for distributing a plurality of cells contained in a cell string received via a first line to a plurality of second lines, comprising a generating unit generating data about order of the cells contained in the cell string, a setting unit loading the data generated by said generating unit into the cells, a distributing unit distributting the cells loaded with the data by said setting unit to the second lines.

According to an eighth aspect of the present invention, there is provided a receiving device connected via a plurality of lines to a transmitting device which cyclically distributes a plurality of cells to the lines in predetermined order while loading a same cell block number into cells to be distributed to the lines in a same cycle, and which transmits the cells loaded with the cell block number to the lines, comprising a receiving unit receiving the cells from said transmitting device via the lines and a arrenging unit arrenging the cells having a same cell block number among a plurality of cells received by the receiving unit in the predetermined order.

According to a ninth aspect of the present invention, in a receiving device according to the eighth aspect, wherein if all the cells into which the same cell block number is loaded are not received, only received cells into which the same cell block number is loaded are arranged in the predetermined order.

According to a tenth aspect of the present invention, the receiving device according to the eighth aspect further comprises a cell retaining unit storing the cells transferred via the lines, a cell multiplexing unit fetching the cells having the same cell block number from said cell retaining unit, while arranging the cells in the predetermined order, and a block number checking unit checking the cell block number of the cells stored in said cell retaining unit, and makes said cell multiplexing unit fetch the cells having the same cell block number from said cell retaining unit.

According to an eleventh aspect of the present invention, there is provided a receiving device comprises a receiving unit receiving a plurality of cells via a plurality of first lines, an arranging unit generating one cell string by arranging the cells on the basis of order data defined as data about order of the of cells constituting said cell string while by multiplexing the cells, and a transmitting unit transmitting the cell string arranged by said arranging unit to a second line.

The network system, the transmitting device, the receiving device according to the present invention are capable of arranging the cells received via the plurality of lines in the predetermined order in spite of the cell delay and the cell fluctuation in each of the plurality of lines. Accordingly, the data communications can be performed more adequately than in the prior art.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Preferred embodiments of the present invention will hereinafter be described with reference to the accompanying drawings.

[Embodiment 1]

To begin with, a network system in an embodiment 1 of the present invention will be described.

<Whole Construction of Network System>

Figure 1:
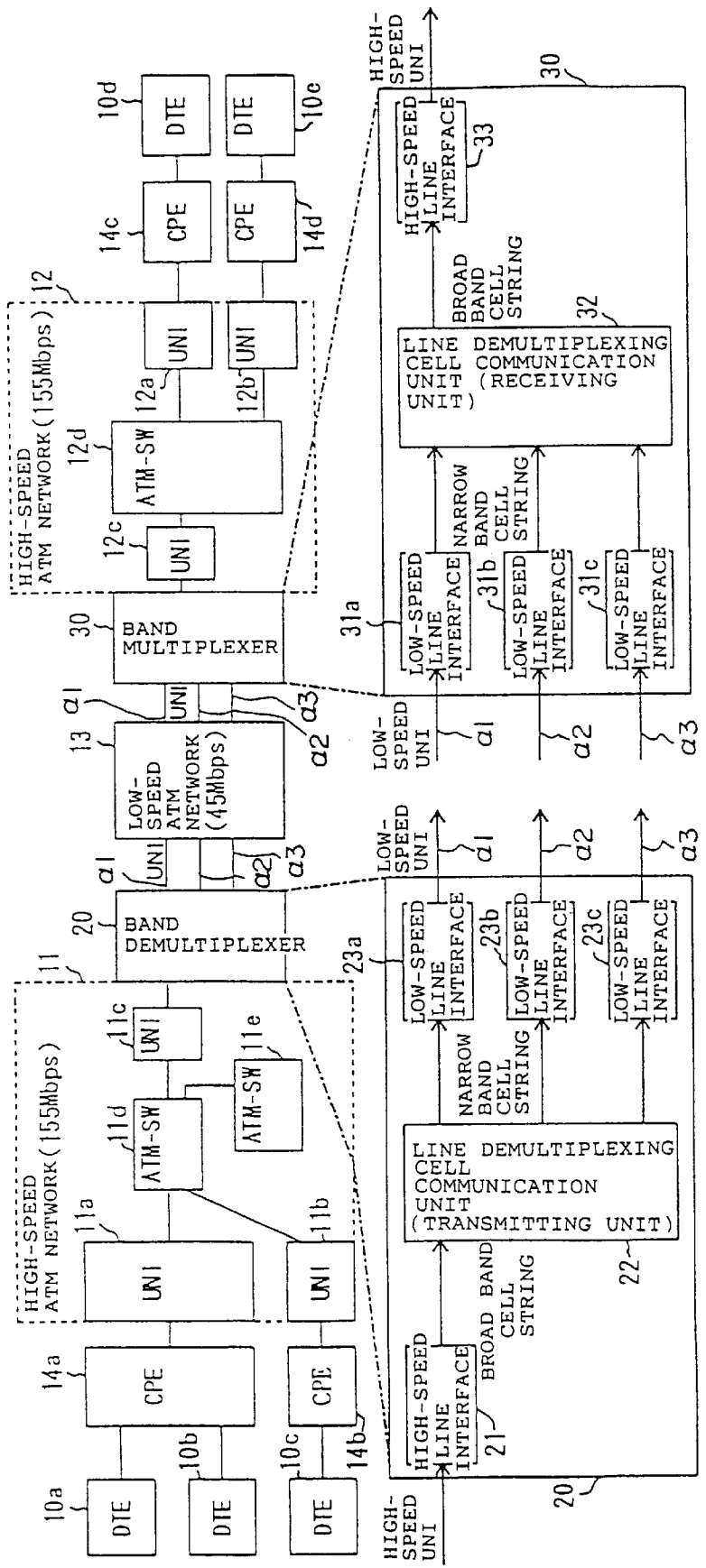
FIG. 1 is a diagram showing a whole construction of a network system in an embodiment 1 of the present invention.

FIG. 1 is a diagram showing a whole construction of the network system in the embodiment 1. The network system show in FIG. 1 is constructed such that a low- speed ATM network 13 is connected as a relay network between high-speed ATM networks 11, 12, wherein data (cells) are transmitted from a left side toward a right side on the sheet surface in FIG. 1.

Referring to FIG. 1, a band demultiplexer 20 is connected to the low-speed ATM network 13 via three low-speed lines α1–α3. The band demultiplexer 20 includes low-speed line interfaces 23a–23c corresponding respectively to the three low-speed lines α1–α3, a line demultiplexing cell communicating unit (a transmitting unit) 22 connected to these interfaces, and a high-speed line interface 21 connected to the transmitting unit 22.

The high-speed ATM network 11 is connected to the band demultiplexer 20. To be specific, the high-speed ATM network 11 includes a high-speed UNI 11c connected to the high-speed line interface 21, an ATM-SW 11d connected to the high-speed UNI 11c, high-speed UNIs 11a and 11b each connected to the ATM-SW 11d, a nd ATM-SW 11e connected to the ATM-SW 11e.

Data terminal equipments (hereinafter abbreviated to [DTE]) 10a, 10b are respectively connected to the high-speed UNI 11a via a customer premises equipment (hereinafter abbreviated to [CPE]) 14a. Further, the DTE 10c is connected via the CPE 14B to the high-speed UNI 11B. Note that an unillustrated DTE is connected via the unillustrated UNI to the ATM-SW 11e of the high-speed ATM network 11.

Further, a band multiplexer 30 is connected to the low-speed ATM network 13 via the three low-speed lines α1–α3. The band multiplexer 30 includes low-speed line interfaces 31a–31c corresponding respectively to the three low-speed lines α1–α3, a line demultiplexing cell communicating unit (a receiving unit)32 connected to these interfaces, and a high-speed line interface 33 connected to the receiving unit 32.

The high-speed ATM network 12 includes an UNI 12c connected to the high-speed line interface 33, an ATM-SW 12d connected to the UNI 12c, and UNIs 12a, 12b respectively connected to the ATM-SW 12d. Then, the DTE 10d is connected via the CPE 14c to the UNI 12a, and the DTE 10e is connected via the CPE 14b to the UNI 12b.

Figure 2:
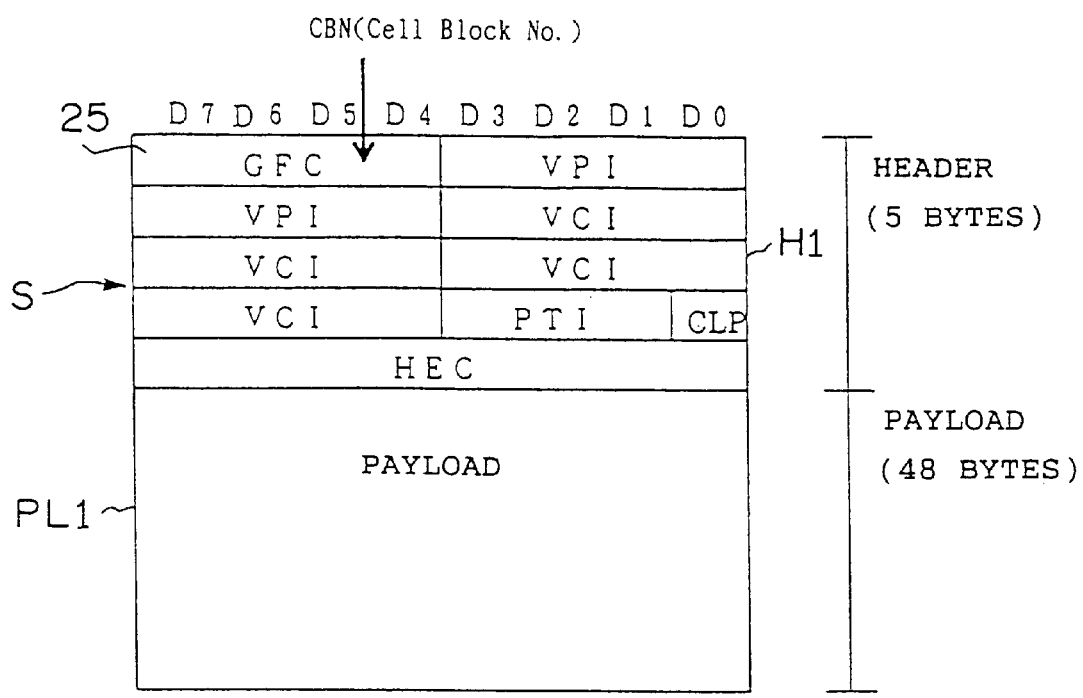
FIG. 2 is an explanatory diagram of a cell.

FIG. 2 is an explanatory diagram showing a format of a cell S (an ATM cell) used when transmitting the data in the network system shown in FIG. 1. The cell S consists of a 5-byte header H1 and a 48-byte payload PL1. Set respectively in the header H1 are an area for storing VPI (Virtual Path Identifier) and VCI (Virtual Channel Identifier) defined as a connection address data of the cell S, an area for storing PT (payload type), an area for storing CLP bit (Cell Loss Priority bit), and an area for storing HEC (Header Error Control) data. Further, a GFC area 25 for storing GFC (Generic Flow Control) data is set in the header H1. The GFC area 25 is, however, undetermined in terms of a standard using method and is therefore an empty area which is not normally used. Further, the user data are stored in the payload PL1.

The above cells S are transmitted at a predetermined transmitting speed in the high-speed ATM networks 11, 12. Herein, the cells are transmitted pursuant to OC3C (Optical Carrier 3 Concatenation) defined an internationally unified transmitting speed by way of one of specifications of SONET (Synchronous Optical Network) in the high-speed networks 11, 12. This OC3C corresponds to STM1 of SDH (Synchronous Digital Hierarchy) and has a transmitting speed of approximately 155 Mbps.

More specifically, the UNIs on the SONET base are used-as the high-speed UNIs 11a–11c or the UNIs 12a–12c in the high-speed ATM networks 11, 12. The cells S are loaded into a SONET frame F1 (see FIG. 3) in the high-speed UNIs 11a–11c or the UNIs 12a–12c. Then, the SONET frame F1 is transmitted within the high-speed ATM networks 11, 12.

Figure 3:
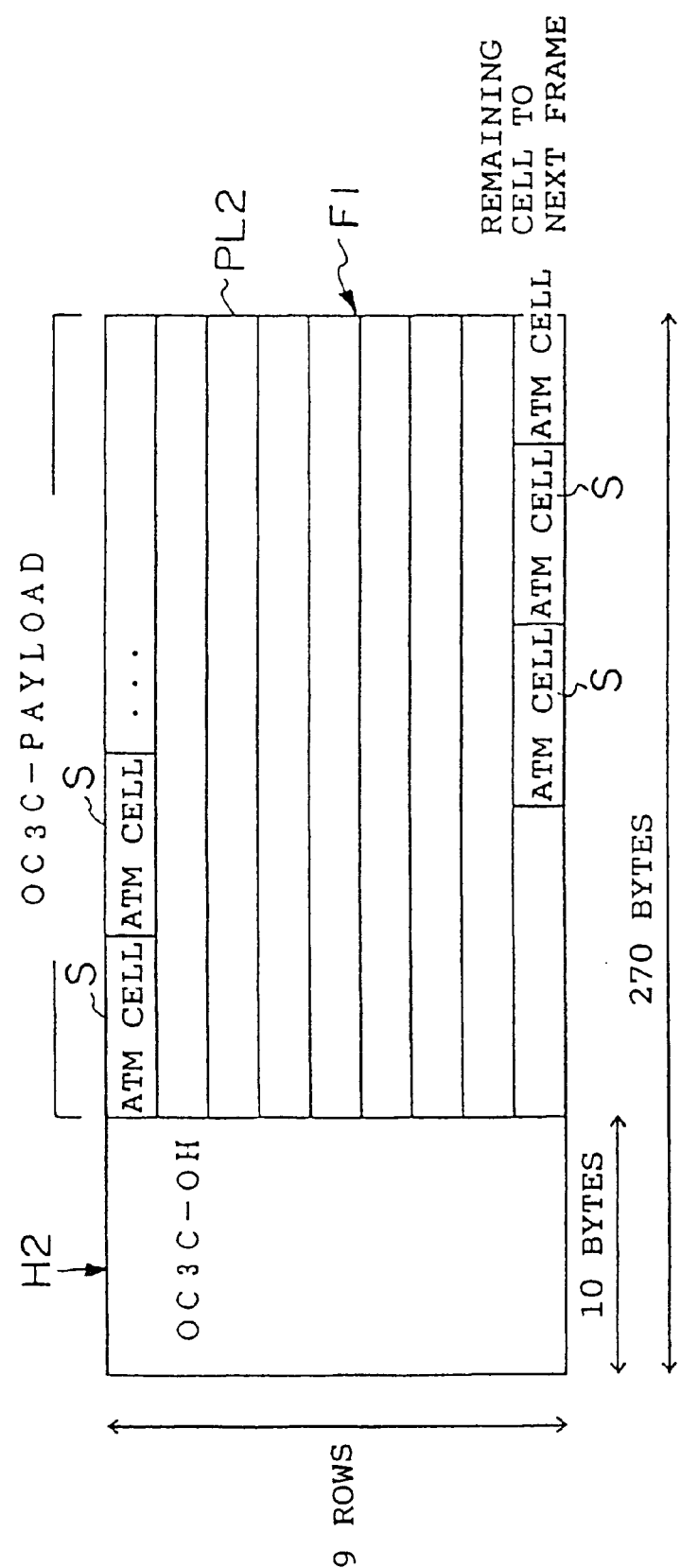
FIG. 3 is an explanatory diagram showing a SONET frame format.

FIG. 3 is a diagram showing a format of the SONET frame F1 based on OC3C. Referring to FIG. 3, the SONET frame F1 consists of a 90-byte OC3C-OH (SONET overhead) H2 and a 2340-byte OC3C payload (payload) PL2. The SONET overhead H2 is stored with data needed for operating and managing the network. Further, a plurality of cells S are loaded into the payload PL2. Referring again to FIG. 3, though the illustration is simplified, the cells S transmitted by three flames based on OC1 are actually multiplexed on a byte unit.

Further, the cells S are transmitted at the predetermined transmitting velocity also in the low-speed ATM network 13. Namely, the cells S are transmitted according to, e.g., DS3 (transmitting velocity: approximately 45 Mbps). More specifically, the cell S is divided into a plurality of frames F2 (see FIG. 4) within the low-speed ATM network 13. Then, the plurality of frames F2 are transmitted within the low-speed ATM network 13'.

Figure 4:
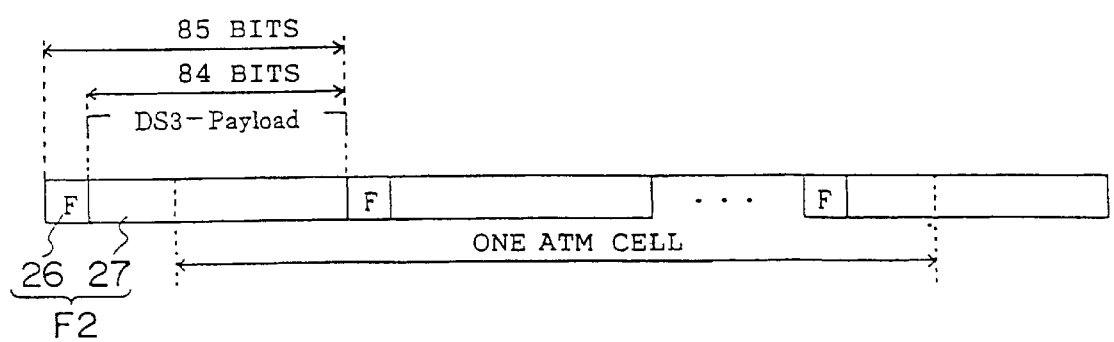
FIG. 4 is an explanatory diagram showing a frame format.

FIG. 4 is an explanatory diagram showing a format of the frame F2 based on the DS3. Referring to FIG. 4, the frame F2 is composed of a 1-bit head flag 27 and a 84-bit payload 27 and therefore has a 85-bit structure.

One cell S is divided into a plurality of segments, which are each stored in the payload 27 of the frame F2.

<Operation of Network System>

Next, an operation of the network system in this embodiment will be explained. An operation in the case of transmitting the data to the DTE 10d or DTE 10e from each of the DTE 10a and the DTE 10b, is described by way of an example. The data transmitted from the DTE 10a or the DTE 10b are transferred in the form of a plurality of cells S to the CPE 14a. The CPE 14a multiplexes the plurality of cells S received from the DTE 10a and the plurality of cells S received from the DTE 10b, and transfers the multiplexed cells S to the high-speed ATM network 11.

In the high-speed ATM network 11, the high-speed UNI 11A loads into the SONET frame F1 the plurality of cells S transferred from the CPE 14a. This SONET frame Fl is transferred to the ATM-SW 11d.

The ATM-SW 11d fetches the plurality of cells S from the SONET frame F1 received from the UNI 11a. Subsequently, the ATM-SW 11d transfers the cells S to the high-speed UNI 11c or the ATM-SW lie in accordance with VPI, VCI stored in the respective cells S. At this time, among the plurality of cells S, the cells S that should be transmitted to the DTE 10d or the DTE 10e are transferred to the high-speed UNI 11c. The high-speed UNI 11c loads into the SONET frame F1 the plurality of cells S received from the ATM-SW 11d, and transfers the frame F1 to the band demultiplexer 20.

In the band demultiplexer 20, the high-speed line interface 21 receives the SONET frame F1 from the high-speed UNI 11c. Thereupon, the high-speed line interface 21 fetches the plurality of cells S from the SONET frame F1, arranges these cells S in one string and sequentially sending the cells S toward the transmitting unit 22. The plurality of cells S transferred to the transmitting unit 22 thereby form a broad band cell string.

The transmitting unit 22 cyclically distributes the plurality of cells S forming the single high-band cell string to the low-speed lines α1–α3. At this time, the transmitting unit 22 distributes the cells S in the order of line numbers set in the low-speed lines α1–α3. In accordance with this embodiment, a line number 1 set in the low-speed line α1, a line number 2 is set in the low-speed line α2, and a line number 3 is set in the low-speed line α3. Accordingly, the transmitting unit 22 distributes the plurality of cells S to one of the low-speed lines α1–α3 in the order of α1, α2 and α3.

To be specific, the transmitting unit 22, whenever receiving the cell S from the high-speed line interface 21, transfers this cell to one of the low-speed line interfaces 23a–23c. At this time, the transmitting unit 22 transfers the cells to one of the low-speed line interfaces 23a–23c in the order such as the low-speed line interface 23a, the low-speed line interface 23b and the low-speed line interface 23c in accordance with the line numbers of the low-speed lines α1–α3.

One broad band cell string is thereby demultiplexed into three narrow band cell strings. Each narrow band cell string is transferred to the low-speed ATM network 13 via one of the low-speed lines 3 as well as through one of the low-speed line interfaces 23a–23c. In the low-speed ATM network 13, through the low-speed UNI, the plurality of cells S forming each narrow band cell string are stored in the plurality of frames F2 and transmitted within the low-speed ATM network 13. Then, each frame F2 is transferred to the band multiplexer 30 via one of the low-speed lines α1–α3.

In the band multiplexer 30, each of the low-speed line interfaces 31a–31c receives the plurality of frames F2 from the low-speed ATM network 13, and restores the plurality of cells S from the plurality of frames F2. Subsequently, each of the low-speed line interfaces 31a–31c arranges the plurality of restored cells S in one string and transfers the cells as a low-band cell string to the receiving unit 32.

The receiving unit 32 forms (restores) one broad band cell string by multiplexing the three narrow band cell string transmitted from the respective low-speed line interfaces 31a–31c, and transfers this cell string to the high-speed line interface 33. That is, the receiving unit 32 sequentially sends the plurality of cells S forming each narrow band cell string to the high-speed line interface 33 in the order of being sent from the high-speed line interface 21 of the band demultiplexer 20.

The broad band cell string sent from the receiving unit 32 is transferred to the high-speed UNI 12c of the high-speed ATM network 12 via the high-speed line interface 33. The high-speed UNI 12c, upon receiving the plurality of cells S forming the broad band cell string, loads the plurality of cells S into the SONET frame Fl and transfers this frame Fl to the ATM-SW 12d.

The ATM-SW 12d, upon receiving the SONET frame Fl from the UNI 12c, fetches the plurality of cells S from this SONET frame Fl, and transfers the respective cells S to the UNI 12a or the UNI 12b on the basis of the VPI, VCI stored in each cell S. Then, the plurality of cells S transferred to the UNI 12a from the ATM-SW 12d, are received by the DTE 10d via the CPE 14c. Further, the plurality of cells S transferred to the UNI 12b from the ATM-SW 12d are received by the DTE 10e via the CPE 14b.

It should be noted that the band demultiplexer 20 and the band multiplexer 30 in the actual network system are constructed into one united device. Accordingly, in the case of transferring the data to any one of the DTEs 10a–10c from the DTE 10d or the DTE 10e in the actual network system (the cells S are transferred from the right side to the left side on the sheet surface in FIG. 1), all the same operations as those described above are conducted. Further, the low-speed ATM network 13 may also be constructed of only a plurality of physical lines.

<Transmitting Unit and Receiving Unit>

In the network system described above, the transmitting unit of the band demultiplexer 20 demultiplexes one broad band cell string into three narrow band cell strings, nd transfers the three cell strings to the low-speed ATM network 13. Moreover, the receiving unit 32 of the band multiplexer 30 multiplexes the three narrow band cell strings transferred from the low-speed ATM network 13, and thus restores one broad band cell strings. This being the case, the transmitting unit 22 and the receiving unit 32 are constructed as follows in order to prevent the order of the plurality of cells S forming the broad band cell string from differing on the side of the band demultiplexer 20 and on the side of the band multiplexer 30 due to a fluctuation and a delay of the cells in the network system.

<Construction of Transmitting Unit>

Figure 5:
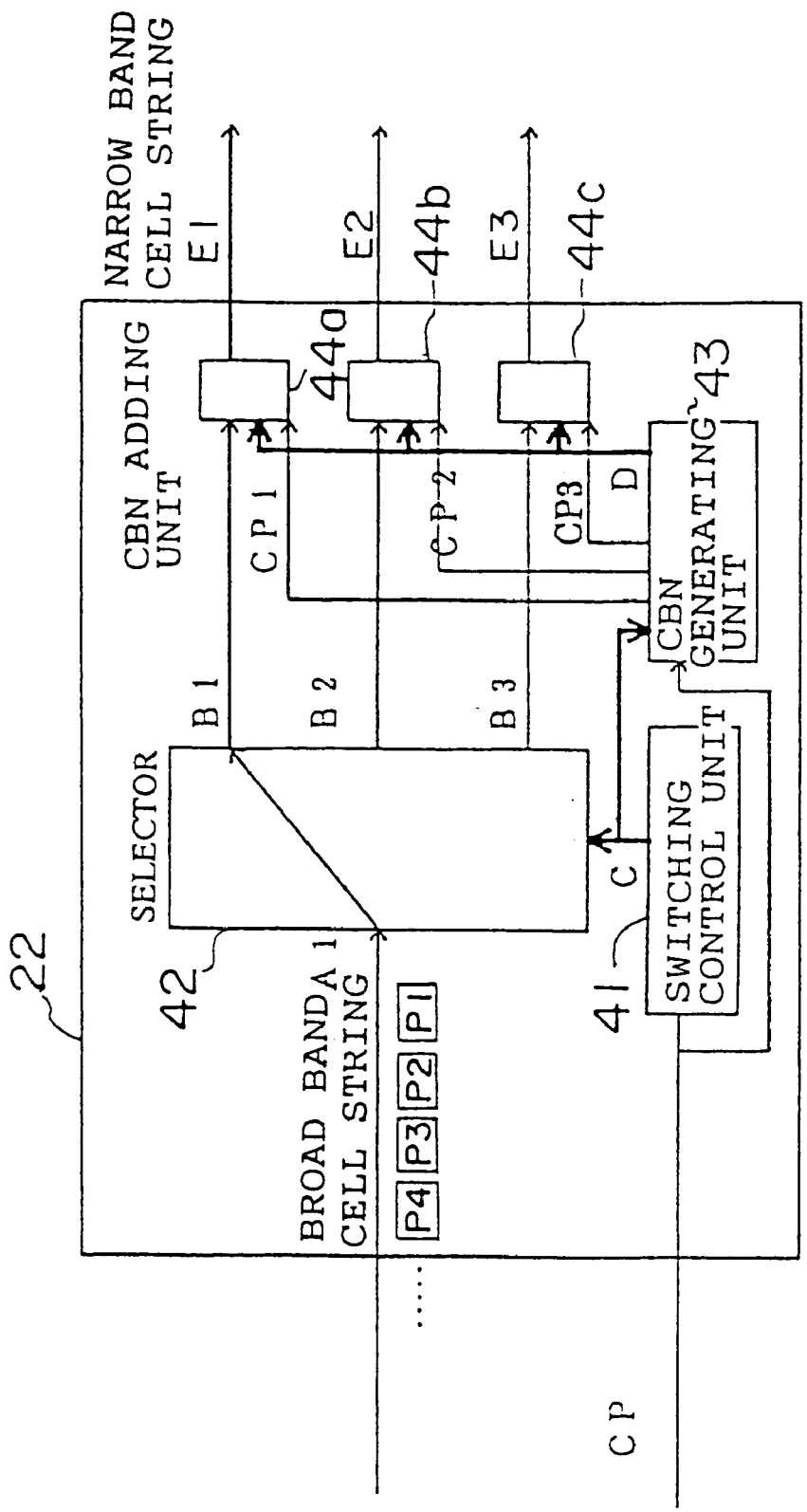
FIG. 5 is a diagram illustrating a construction of a transmitting unit shown in FIG. 1.

FIG. 5 is a diagram illustrating a construction of the transmitting unit 22 in the band demultiplexer 20 shown in FIG. 1. Referring to FIG. 5, the transmitting unit 22 is constructed of switching control unit 41, a selector 42, a CBN generating unit 43, and CBN adding units 44a–44c.

Figure 6:
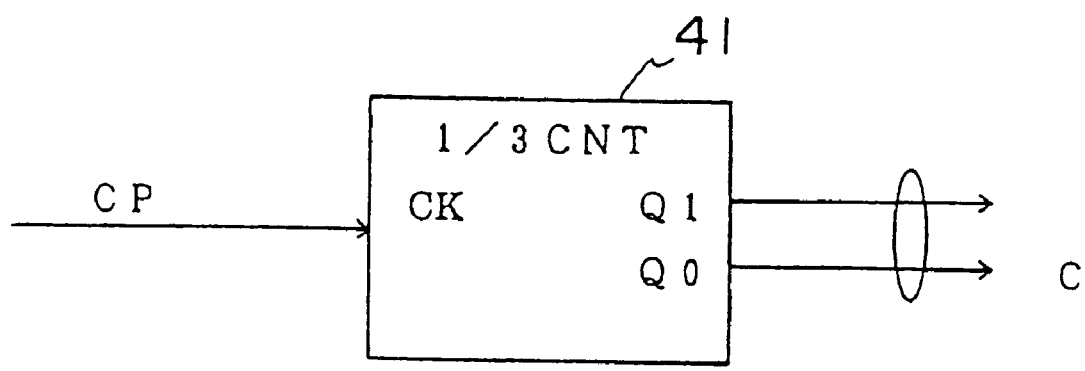
FIG. 6 is a diagram sowing a construction of a switching control unit shown in FIG. 5.
Figure 7:
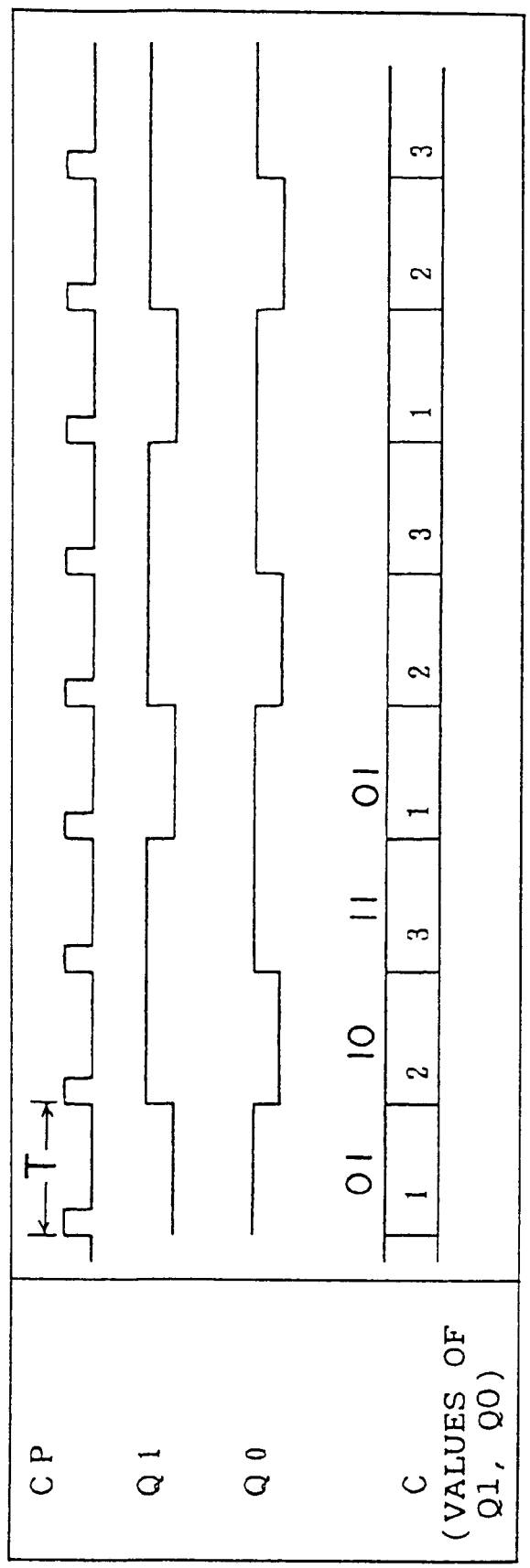
FIG. 7 is an explanatory diagram showing an operation of the switching control unit shown in FIG. 6.

FIG. 6 is a diagram illustrating a construction of the switching control unit 41 shown in FIG. 5. FIG. 7 is an explanatory diagram showing an operation of the switching control unit 41 illustrated in FIG. 6. The switching control unit 41 is classified as, so to speak, a one-third frequency dividing 2-bit counter, an input terminal CK of which receives an input of a cell pulse CP defined as a signal indicating the head of the cell S. The cell pulse CP becomes "1" (HIGH) every time the head of the cell S is detected. The switching control unit 41 outputs a pulse Q1 and a pulse Q2 at every one cycle of the cell pulse CP. A tuple of the pulses Q1, Q2 is supplied as a control signal C to the selector 42. Note that the cell pulse CP is generated from an unillustrated pulse generating circuit mounted in the band demultiplexer 20.

Herein, each of the pulses Q1, Q2 repeats such an operation that this pulse becomes "0" (LOW) during one cycle of the cell pulse CP and becomes "1" (HIGH) during cycles of the cell pulse CP. A pulse Q0, however, rises with a one-cycle delay posterior to the pulse Q1. Accordingly, the switching control unit 41 cyclically supplies the selector 42 with each of a counter value of "1"(Q1=0, Q0=1), a counter value of "2" (Q1=1, Q0=0) and a counter value of "3" (Q1=1, Q0=1) as a control signal C. In accordance with this embodiment, the control signal of "1" is made corresponding to the low-speed line α1, the control signal of "2" is to the low-speed line α2, and the control signal C of "3" is to the low-speed line α3.

Figure 8:
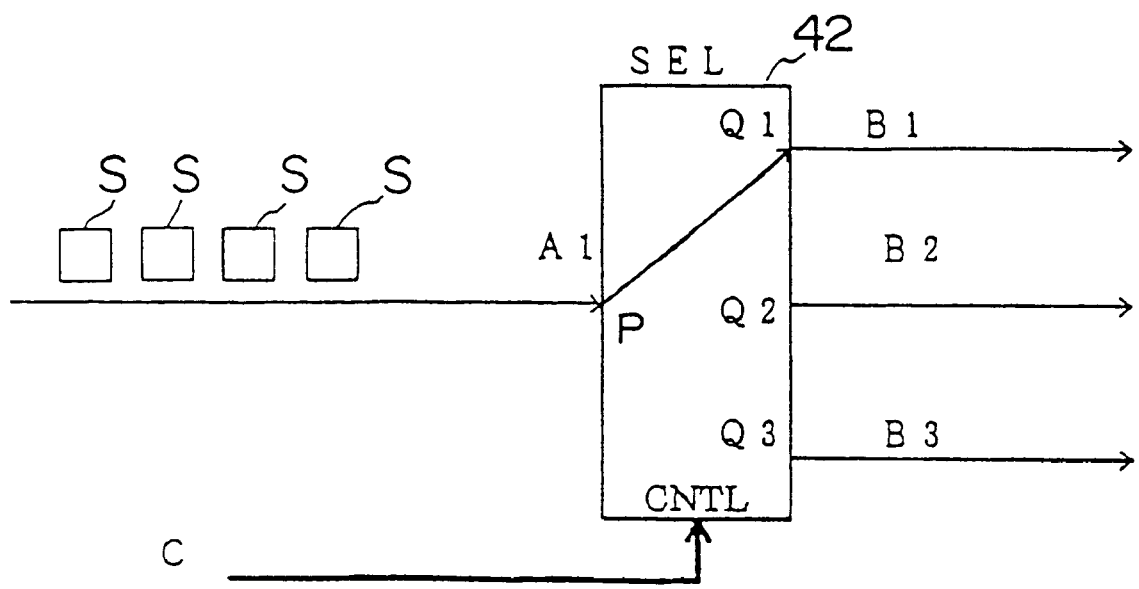
FIG. 8 is a diagram showing a configuration of a selector illustrated in FIG. 5.
Figure 9:
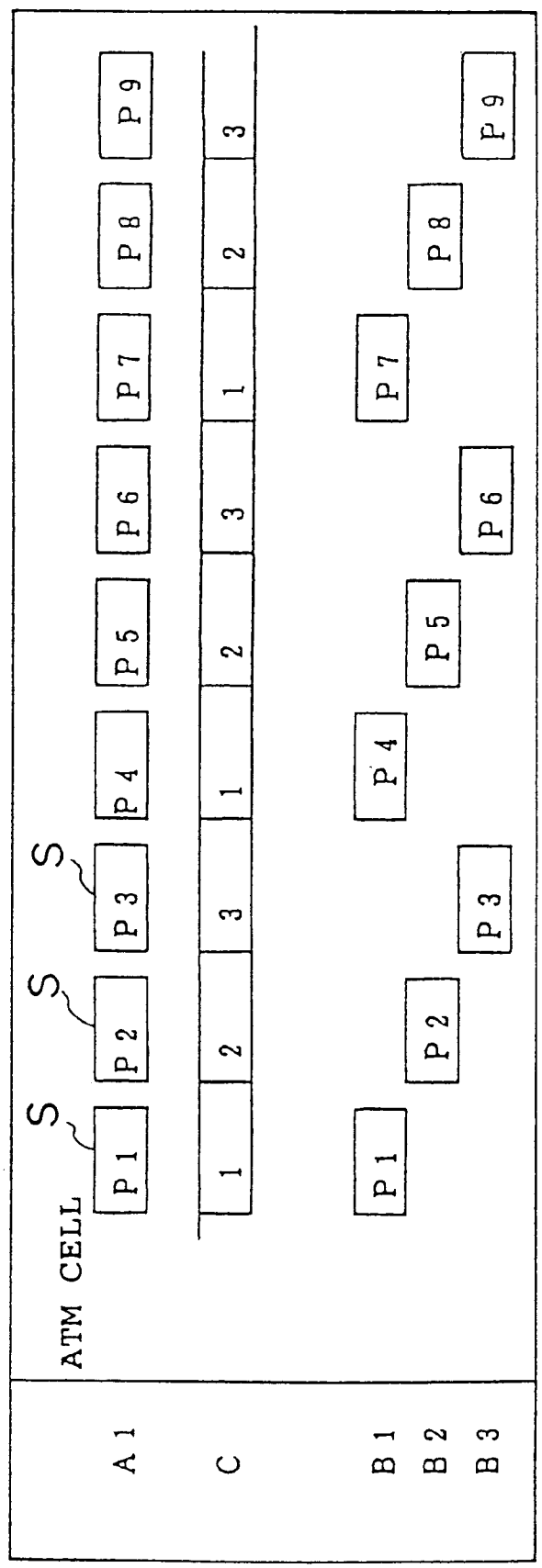
FIG. 9 is an explanatory diagram of an operation of the selector shown in FIG. 8.

FIG. 8 is a diagram showing a structure of the selector 42 shown in FIG. 5. Further, FIG. 9 is an explanatory diagram showing how the selector 42 show in FIG. 8 operates. The selector 42 includes an input terminal P connected to the high-speed line interface 21, an output terminal Q1 connected to a CBN adding unit 44a, an output terminal Q2 connected to the CBN adding unit 44b, an output terminal Q3 connected to the CBN adding unit 44c, and a control terminal CNTL connected to the switching control unit 41. The plurality of cells S (the broad band cell string) sent from the high-speed line interface 21 are sequentially inputted as inputs A1 to the selector 42. The selector 42 sends the cells S inputted from the input terminal P via any one of the output terminals Q1–Q3 in accordance with the control signals C.

Namely, the selector 42, when the control signal C is "1", sends the cells S as outputs B1 from the output terminal Q1. Further, the selector 42, when the control signal C is "2", sends as outputs B2 from the output terminal Q2. Moreover, the selector 42, when the control signal C is "3", sends the cells S as outputs B3 from the output terminal Q3. Thus, the plurality of cells S forming the broad band cell string are cyclically sent from any one of the output terminals Q1–Q3 of the selector 42.

For instance, as shown in FIG. 9, it is assumed that cells P1–P9 are inputted in the form of the plurality of cells S forming the broad band cell string to the selector 42. At this time, the control signals C are inputted cyclically in the order of, e. g., "1", "2" and "3" to the selector 42 from the switching control unit 41. Thereupon, the selector 42, in accordance with the control signals C, sends the cell P1 from the output terminal Q1, the cell P2 from the output terminal Q2 and the cell P3 from the output terminal Q3. Subsequently, the selector 42 sends the cell P4 from the output terminal Q1, the cell P5 from the output terminal Q2 and the cell P5 from the output terminal Q3. Similarly, the selector 42 sends the cell P7 from the output terminal Q1, the cell P8 from the output terminal Q2 and the cell P9 from the output terminal Q3.

The single broad band cell string is thereby demultiplexed into three narrow band cell strings. Then, the cell S (the output B1) transmitted from the output terminal Q1 of the selector 42 is transferred to the CBN adding unit 44a. Further, the cell S (the output B2) sent from the output terminal Q2 of the selector 42 is transferred to the CBN adding unit 44b. Moreover, the cell S (the output B3) sent from the output terminal Q3 of the selector 42 is transferred to the CBN adding unit 44c.

Figure 10:
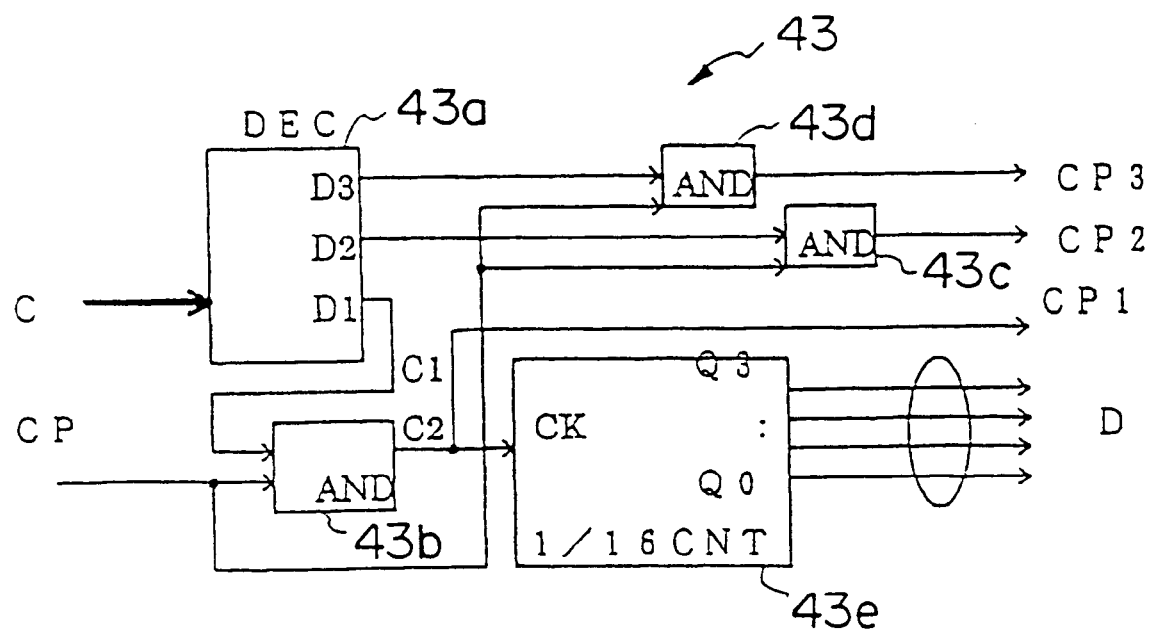
FIG. 10 is a diagram showing a construction of a CBN generating unit shown in FIG. 5.
Figure 11:
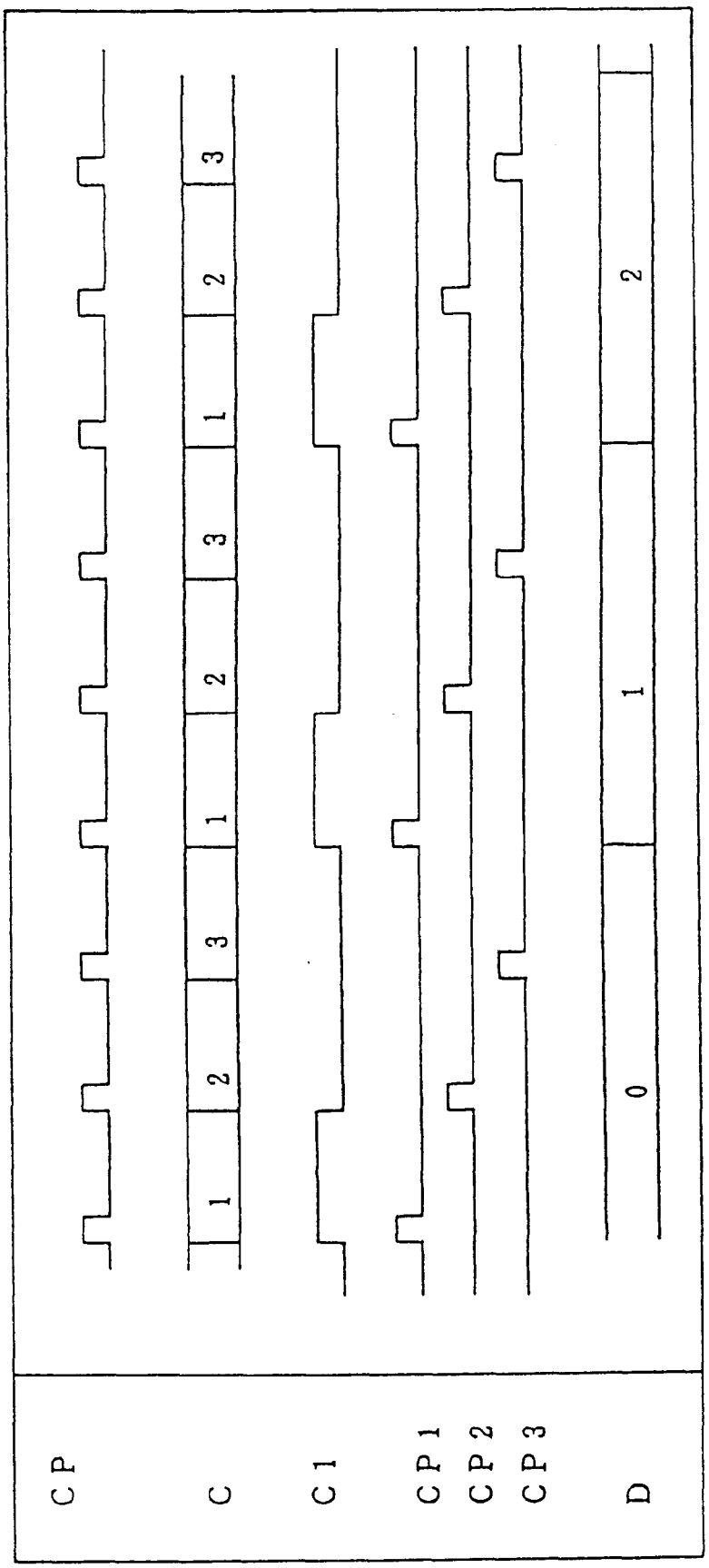
FIG. 11 is an explanatory diagram showing an operation of the CBN generating unit shown in FIG. 10.

The CBN generating unit 43 is constructed of an LSI. This CBN generating unit 43 generates a cell block number (CBN) D, and transfers the generated cell block number D to each of the CBN adding units 44a–44c. FIG. 10 is a diagram showing a configuration of the CBN generating unit 43 shown in FIG. 5. FIG. 11 is an explanatory diagram showing an operation of the CBN generating unit 43 shown in FIG. 10. Referring to FIG. 10, the CBN generating unit 43 is constructed of decoder 43a, AND circuits 43b–43d and a 4-bit counter 43e.

The control signals C are inputted to the decoder 43a from the switching control unit 41. The decoder 43a has output terminals D1–D3. The output terminal D1 is connected to the AND circuit 43b, the output terminal D2 is connected to the AND circuit 43c, and the output terminal D3 is connected to the AND circuit 43d. Further, the cell pulses CP are inputted to the AND circuits 43b–43d. An output terminal of the AND circuit 43b is connected to the 4-bit counter 43e and the CBN adding unit 44a. Further, an output terminal of the AND circuit 43b is connected to the CBN adding unit 44b. Moreover, an output terminal of the AND circuit 44d is connected to the CBN adding unit 44c.

This decoder 43a outputs a signal of "0" (LOW) or "1" (HIGH) from each of the output terminals DI - D3 in accordance with the control signal C inputted. That is, the decoder 43a outputs, when the control signal C of "1" is inputted, "0" from the output terminals D2, D3, and outputs "1" as an output Cl from the output terminal D1. Further, the decoder 43a outputs, when the control signal C of "2" is inputted, "0" from the output terminals D1, D3, and outputs "1" from the output terminal D2. Moreover, the decoder 43a outputs, when the control signal C of "3" is inputted, "0" from the output terminals D1, D2, and outputs "1" from the output terminal D3.

As illustrated in FIG. 11, the signal of "1" outputted from the decoder 43a is inputted to the AND circuit 43b substantially simultaneously with the cell pulse CP of "1". Accordingly, when the output C1 of "1" is outputted from the decoder 43a, "1" is inputted as the output C2 to the 4-bit counter 43e from the AND circuit 43b, and at the same time the cell pulse CP1 of "1" indicating the head of the cell S is inputted to the CBN adding unit 44a.

Further, when "1" is outputted from the output terminal D2 of the decoder 43a, the signal of this "1" and the cell pulse CP of "1" are substantially simultaneously inputted to the AND circuit 43c. Thereupon, the cell pulse CP2 of "1" is outputted from the AND circuit 43c. Further, when "1" is outputted from the output terminal D3 of the decoder 43a, this signal of "1" and the cell pulse CP of "1" are substantially simultaneously inputted to the AND circuit 43d. Thereupon, the cell pulse CP3 of "1" is outputted from the CBN adding unit 44c.

The 4-bit counter 43e increments the counter value each time the output C2 is inputted from the AND circuit 43b. If the counter value is, however, "16", the counter value is set back to "0". The counter value of this 4-bit counter 43e serves as the cell block number D. This cell block number D is given to any one of the CBN adding units 44a–44c together with any one of the cell pulses CP1–CP3 of "1", which is outputted from any one of the AND circuits 43b–43d.

Namely, if the control signal C inputted to the decoder 43a is "1", the cell block number D is given to only the CBN adding unit 44a. Further, if the control signal C is "2", the cell block number D is given to only the CBN adding unit 44b. Moreover, if the control signal C is "3", the cell block number D is supplied to only the CBN adding unit 44c. Thereafter, when the control signal C of "1" is inputted again to the decoder 43a, the counter value of the 4-bit counter 43e is incremented. Therefore, the cell block numbers D incremented by "1" are sequentially given to the CBN adding units 44a–44c.

Figure 12:
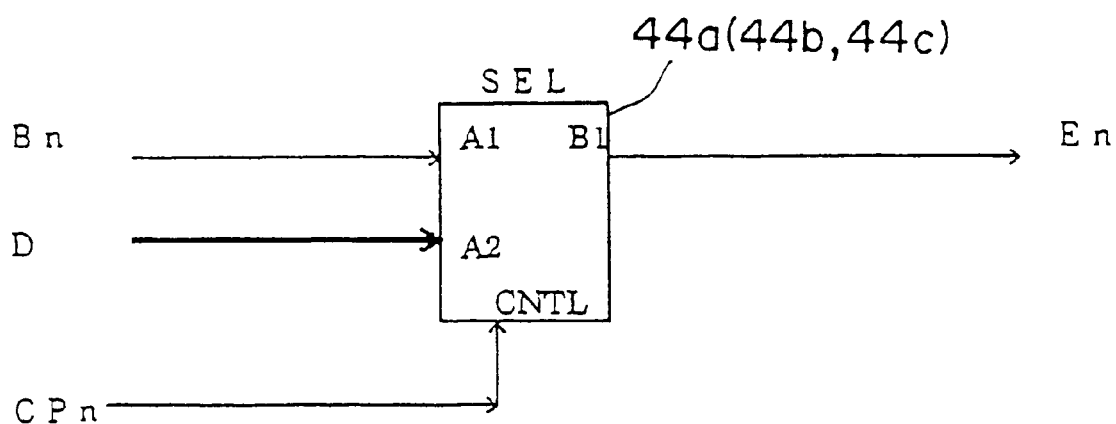
FIG. 12 is an diagram illustrating a construction of a CBN adding unit shown in FIG. 5.
Figure 13:
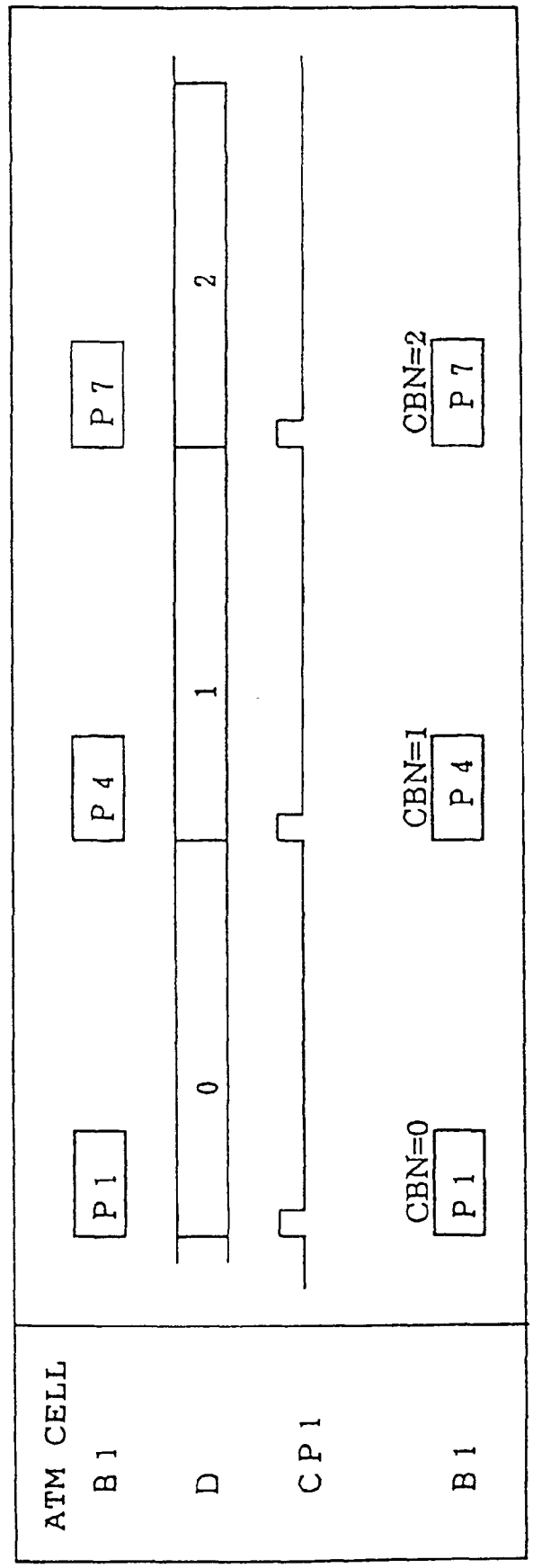
FIG. 13 is an explanatory diagram showing an operation of the CBN adding unit shown in FIG. 12.

FIG. 12 is a diagram showing a construction of the CBN adding units 44a–44c shown in FIG. 5. Further, FIG. 13 is an explanatory diagram showing operations of the CBN adding units 44a–44c illustrated in FIG. 12. Each of the CBN adding units 44a–44c has the same configuration, and therefore the CBN adding unit 44a is herein exemplified.

Referring to FIG. 12, the CBN adding unit 44a is constructed of the LSI. The CBN adding unit 44a incudes an input terminal A1, an input terminal A2, and output terminal B1, and a control terminal CNTL. The cell S is inputted to the input terminal Al from the selector 42. The cell block number D is inputted to the input terminal A2 from the CBN generating unit 43. Then, the cell pulse CP1 outputted from the CBN generating unit 43 is inputted to the control terminal CNTL.

The CBN adding unit 44a, upon receiving the cell pulse CP1 of "1" from the CBN generating unit 43, adds the cell block number D inputted from the input terminal A2, to the cell S inputted from the input terminal A1. At this time, the CBN adding unit 44a stores the GFC area 25 (see FIG. 2) in the header Hi of the cell S with the cell block number D. Then, the cell S to which the cell block number D is added is transmitted from the output terminal B1.

FIG. 13 shows an example of operation of the CBN adding unit 44a when the transmitting unit 22 receives the cells P1–P9 forming the broad band cell string. In this case, the selector 42 transfers the cells P1, P4, P7 to the CBN adding unit 44a (see FIG. 9).

Further, the cell block number D given by the CBN adding unit 44a turns out to be a value incremented by "1" every time the signal of "1" is inputted to the CBN adding unit 44a. Accordingly, the CBN adding unit 44a, when the cell block number D (CBN=0) of, e.g., "0" is added to the cell P1, adds the cell block number D (CBN=1) of "1" to the cell P4, and the cell block number D (CBN=2) of "2" to the cell P7.

Thus, each of the CBN adding units 44a–44c adds the same cell block number D to the plurality of cell S forming the broad band cell string per number-of-low-speed-lines N (N=3 in this embodiment). Each of the CBN adding units 44a–44c thereby defines a cell block by structuring the plurality of cells S forming the broad band cell string into a block.

It is to be note that the GFC area 25 of the cell S can be stored with 4-bit data, and therefore the cell block number D may involve the use of 16 sets of numbers corresponding to any one set of "0000"–"1111". The 4-bit counter 43e of the CBN generating unit 43 is constructed in consideration of the number of bits storable in this GFC area 25. Further, the number-of-flow-speed-lines N may be 2 or greater.

Figure 14:
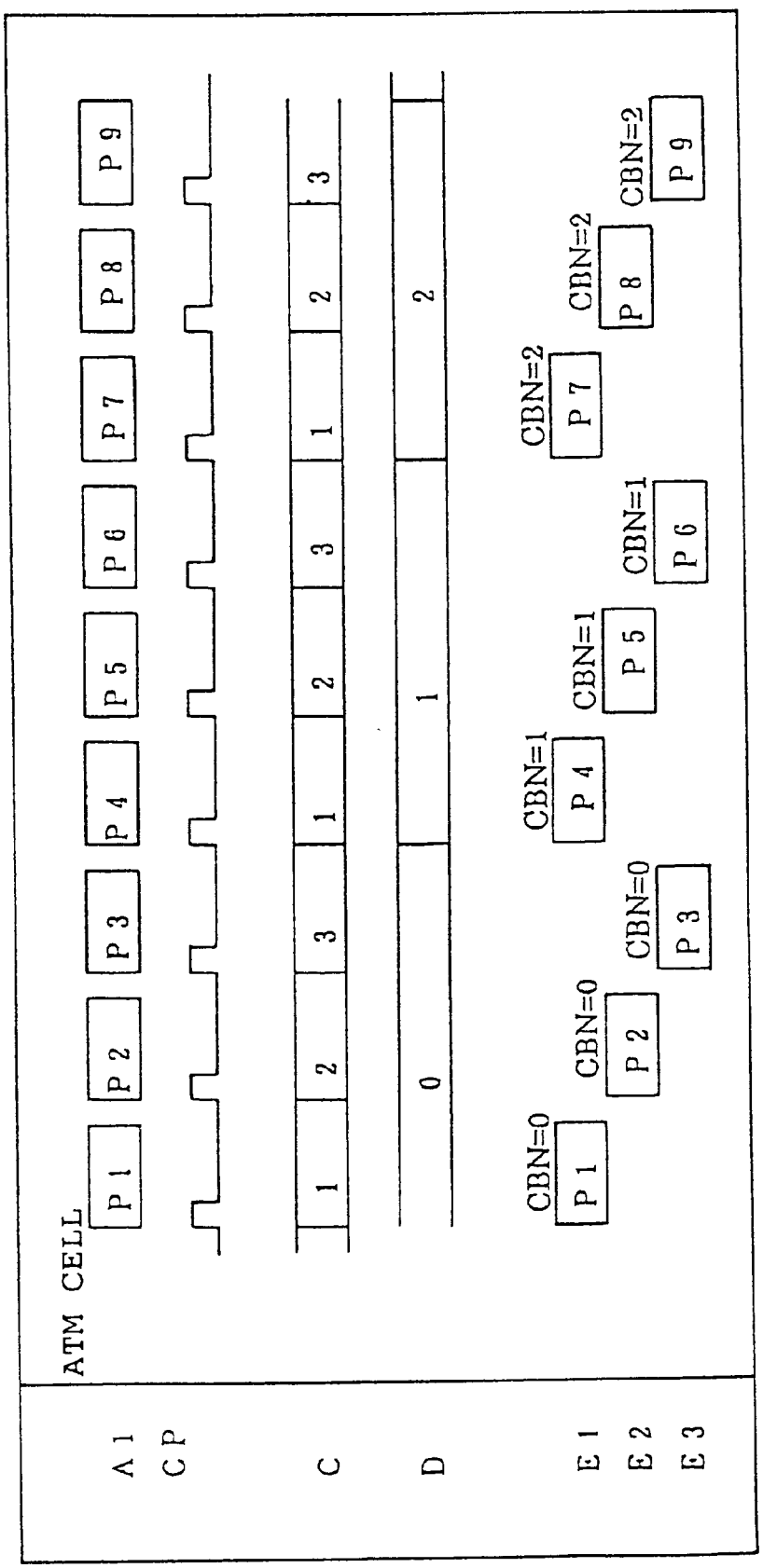
FIG. 14 is an explanatory diagram showing an operation of a transmitting unit shown in FIG. 5.

FIG. 14 is a diagram showing an example of the whole operations of the transmitting unit 22 illustrated in FIG. 5. FIG. 14 shows an example of operation in a case where the high-speed line interface 21 transfers the cells P1–P9 as the plurality of cells S forming the broad band cell string to the transmitting unit 22.

The selector 42, upon receiving the cell P1, supplies the cell P1 to the CBN adding unit 44a in accordance with the control signal C of "1" inputted from the switching control unit 41. At this time, the CBN generating unit 43 supplies the CBN adding unit 44a with the cell pulse CP1 of "1" and the cell block number D of "0". The CBN adding unit 44a adds the cell block number D of "0" to the cell P1 received from the selector 42 in accordance with the cell pulse CP1 of "1", and outputs the cell P1 as an output E1.

Subsequently, the selector 42, upon receiving the cell P2, supplies the CBN adding unit 44b with the cell P2 in accordance with the control signal C of "2" inputted from the switching control unit 41. At this time, the CBN generating unit 43 supplies the CBN adding unit 44b with the cell pulse CP2 of "1" and the cell block number D of "0". The CBN adding unit 44b adds the cell block number D of "0" to the cell P2 received from the selector 42 in accordance with the cell pulse CP2 of "1", and outputs the cell P2 as an output E2.

Subsequently, the selector 42, upon receiving the cell P3, supplies the CBN adding unit 44c with the cell P3 in accordance with the control signal C of "3" inputted from the switching control unit 41. At this time, the CBN generating unit 43 supplies the CBN adding unit 44b with the cell pulse CP1 of "1" and the cell block number D of "0". The CBN adding unit 44c adds the cell block number D of "0" to the cell P3 received from the selector 42 in accordance with the cell pulse CP3 of "1", and outputs the cell P3 as an output E3.

Subsequently, the selector 42, upon receiving the cell P4, supplies the CBN adding unit 44a with the cell P4 in accordance with the control signal C of "1" inputted from the switching control unit 41. At this time, the CBN generating unit 43 supplies the CBN adding unit 44b with the cell block number D of "1". The CBN adding unit 44a adds the cell block number D of "1" to the cell P4 received from the selector 42, and outputs the cell P4 as the output E1.

Thereafter, the above-described operation is executed on the cells P5–P9. A narrow band cell string consisting of the cells PI, P4, P7 is thereby outputted from the CBN adding unit 44a. Further, a narrow band cell string consisting of the cells P2, P5, P8 is outputted from the CBN adding unit 44b. Further, a narrow band cell string consisting of the cells P3, P6, P9 is outputted from the CBN adding unit 44c.

At this time, the CBN adding units 44a–44c add the cell block number D of "0" to the cells P1, P2 and P3. Moreover, the cell block number D of "1" is added to the cells P4, P5, P6. In addition, the cell block number D of "2" is added to the cells P7, P8, P9.

<Construction of Receiving Unit>

Figure 15:
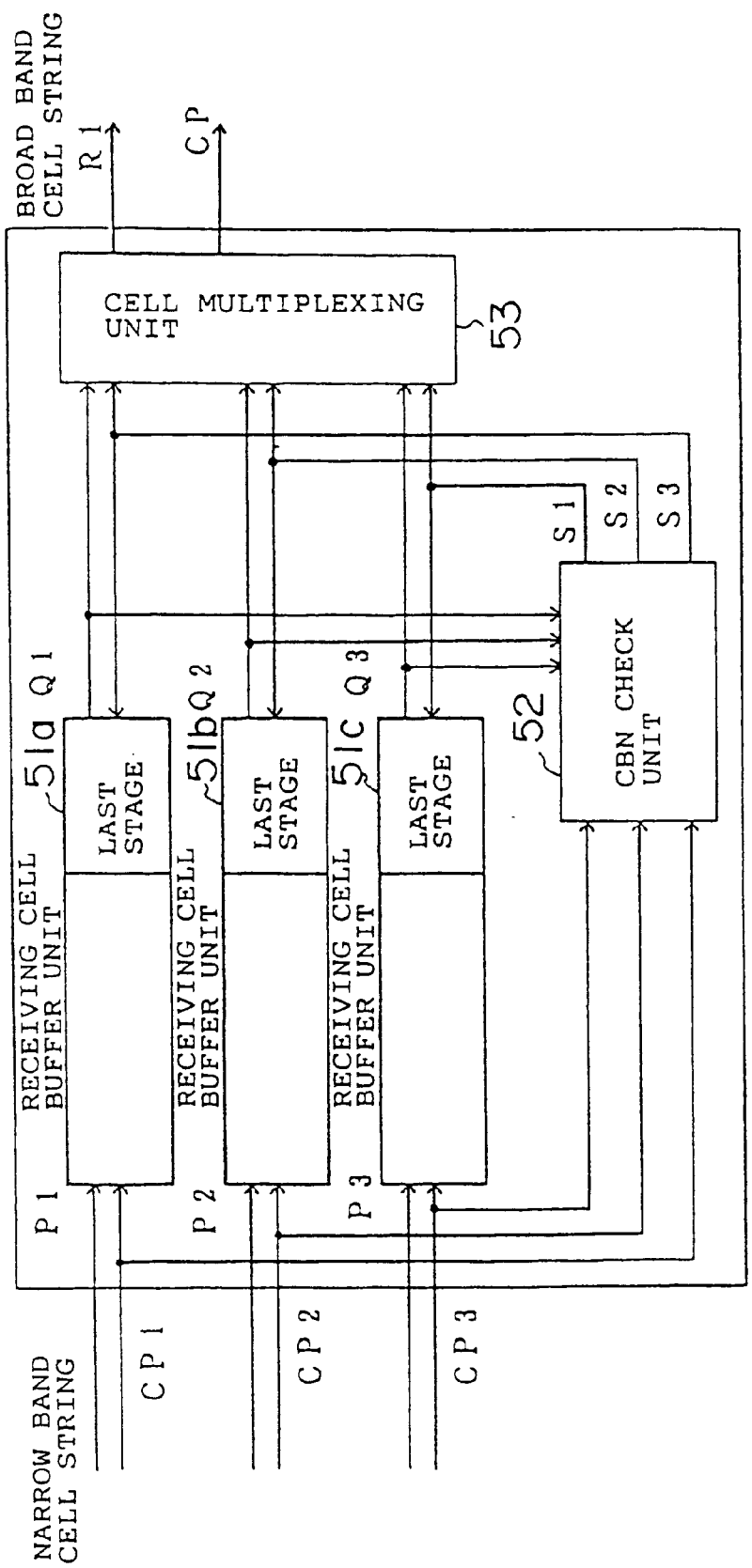
FIG. 15 is a diagram sowing a construction of a receiving unit shown in FIG. 1.

FIG. 15 is a diagram showing a construction of the receiving unit 32 in the band multiplexer 30 shown in FIG. 1. The receiving unit 32 is constructed of receiving cell buffer units (cell FIFOs) 51a–51c provided corresponding to the low-speed line interfaces 31a–31c, a cell multiplexing unit 52 connected thereto, and a CBN check unit 52 connected to the receiving cell buffer units 51a–51c and the cell multiplexing unit 52.

Three narrow band cell strings are inputted via any one of the low-speed line interfaces 31a–31c to the receiving unit 32. Further, when the cell S is inputted to the receiving cell buffer unit 51a, the cell pulse CP1 of "1" which indicates the head of this cell S is inputted to the receiving cell buffer unit 51a and the CBN check unit 52.

Further, when the cell S is inputted to the receiving cell buffer unit 51b, the cell pulse CP2 of "1" which indicates the head of this cell S is inputted to the receiving cell buffer unit 51b and the CBN check unit 52. Moreover, when the cell S is inputted to the receiving cell buffer unit 51c, the cell pulse CP3 of "1" which indicates the head of this cell S is inputted to the receiving cell buffer unit 51c and the CBN check unit 52.

Figure 16:
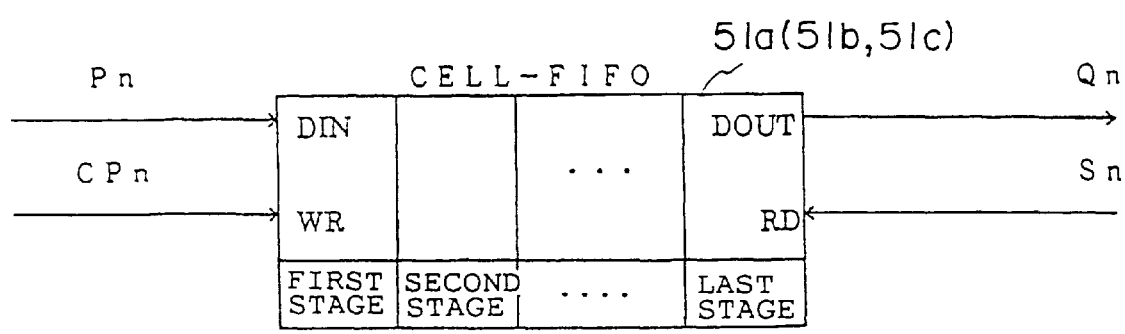
FIG. 16 is a diagram showing a construction of a receiving cell buffer unit shown in FIG. 15.
Figure 17:
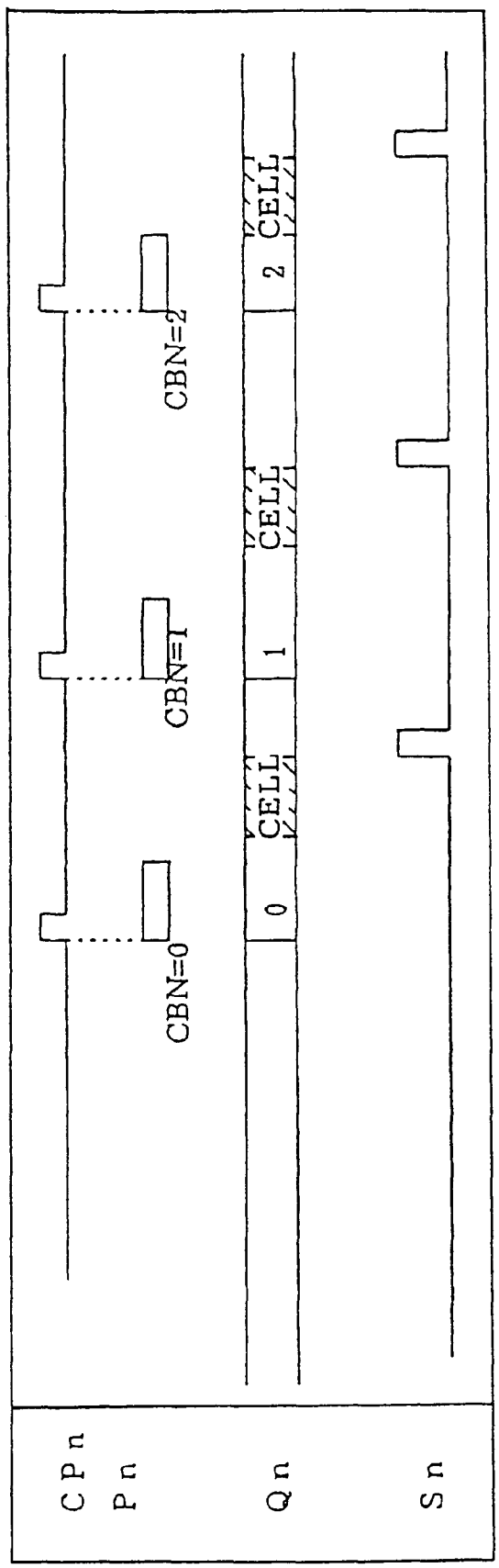
FIG. 17 is an explanatory diagram showing an operation of the receiving cell buffer unit shown in FIG. 16.

FIG. 16 is a diagram illustrating a configuration of one of the receiving cell buffer units 51a–51c shown in FIG. 15. FIG. 17 is an explanatory diagram showing the operation of one of the receiving cell buffer units 51a–51c shown in FIG. 16. The respective receiving cell buffer units 51a–51c have the same configuration, and hence the receiving cell buffer unit 51a is herein exemplified.

As shown in FIG. 16, the receiving cell buffer unit 51a is a FIFO (First-in First-out) having multi-staged storage areas. The plurality of cells S forming the narrow band cell string transmitted from the low-speed line interface 31a are sequentially inputted to the receiving cell buffer unit 51a. Further, the cell pulse CP1 of "1" which indicates the head of this cell S is inputted to the receiving cell buffer unit 51a every time the cell S is inputted. Further, the receiving cell buffer unit 51a inputs the cell block number D of the cell S stored in the last stage to the CBN check unit 52. Then, the receiving cell buffer unit 51a, upon receiving a cell transmission signal (an output Si of "1") from the CBN check unit 52, transmits the cell S stored in the last stage to the cell multiplexing unit 53.

Figure 18:
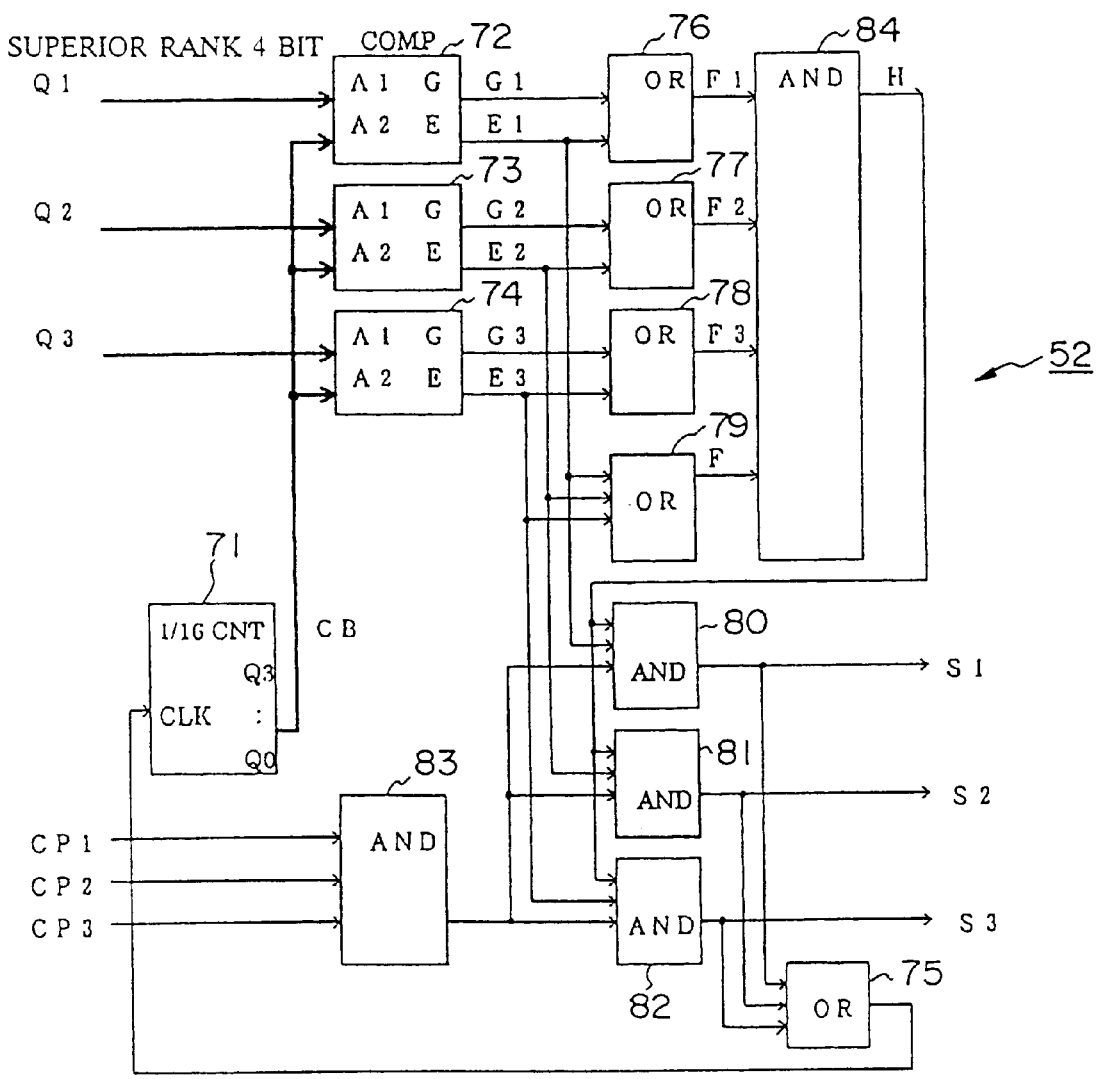
FIG. 18 is a diagram illustrating a construction of a CBN check unit shown in FIG. 15.
Figure 19:
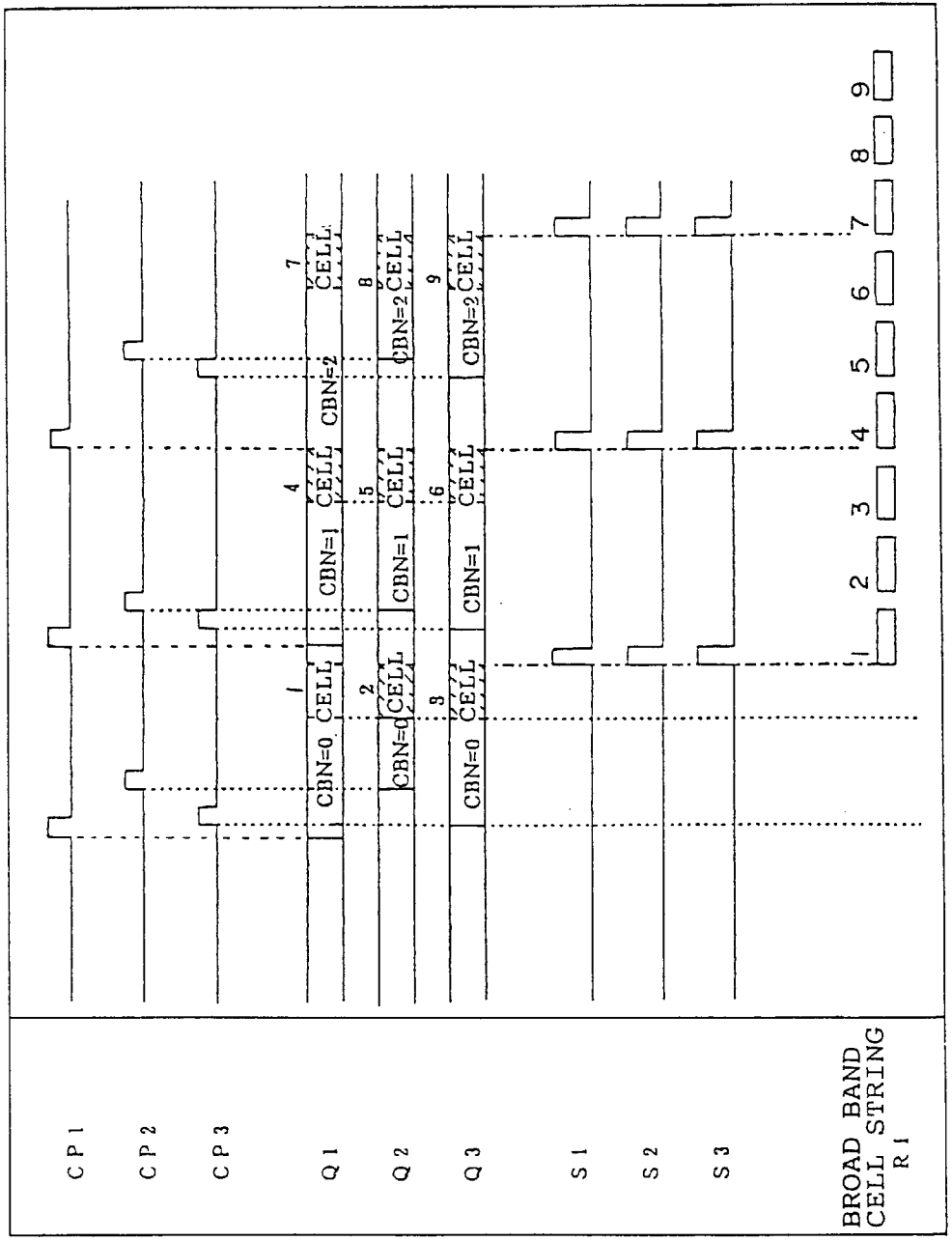
FIG. 19 is an explanatory diagram showing an operation of the CBN check unit shown in FIG. 18.

FIG. 18 is a diagram illustrating a construction of the CBN check unit 52 shown in FIG. 15. Further, FIG. 19 is an explanatory diagram showing an operation of the CBN check unit 52 shown in FIG. 18. FIG. 18, however, shows a construction by way of an example, wherein the number of cells lost in the low-speed ATM network 13 is 1 or less per 16 pieces of cells. Referring gain to FIG. 18, the CBN check unit 52 comprises a 4-bit counter 71, comparators 72–74, OR circuits 75–79 and AND circuits 80–84.

Herein, the 4-bit counter 71 is connected to each of the comparators 72–74 and the OR circuit 75. The 4-bit counter 71 supplies each of the comparators 72–74 with any one of 16 sets of counter values of "0000"–"1111" as a check signal CB. The 4-bit counter, when the signal of "1" is inputted from the OR circuit 75, increments the counter value by "1". If the counter value is "1111", however, the counter value is set back to "0000". Note that the counter value of the 4-bit counter 71 is so set as to synchronize with the counter value of the 4-bit counter 43e of the transmitting unit 22 at all times.

The comparator 72 includes input terminals A1, A2 and output terminals G, E. The cell block number D of the cell S existing in the last stage of the receiving cell buffer unit 51*a*, is inputted to the input terminal A1 of the comparator 72. Further, the check signal CB is inputted to the input terminal A2 of the comparator 72. The comparator 72 compares the cell block number D with the check signal CB. At this time, if the cell block number D is coincident with the check signal CB, the comparator 72 outputs the signal of "1" as the output E1 from an output terminal E. This signal of "1" is inputted to the OR circuit 76, the OR circuit 79, and the AND circuit 80. Further, the comparator 72, if the cell block number D is greater by "1" than the check signal CB, the signal of "1" is inputted as an output G1 from an output terminal G to the OR circuit 76.

A comparator 73 has the same construction as the comparator 72. The cell block number D of the cell S existing in the last stage of the receiving cell buffer unit 51*b*, is inputted to the input terminal A1 of the comparator 73. Further, the check signal CB is inputted to the input terminal A2 of the comparator 73. The comparator 73 compares the cell block number D with the check signal CB and, if coincident with each other, outputs the signal of "1" as an output E2 from the output terminal E. This signal of "1" is inputted to an OR circuit 77, the OR circuit 79, and the AND circuit 81. Further, the comparator 73, if the cell block number D is greater by "1" than the check signal CB, the signal of "1" is inputted as an output G2 from the output terminal G to the OR circuit 77.

The comparator 74 has the same construction as the comparator 72. The cell block number D of the cell S existing in the last stage of the receiving cell buffer unit 51*c*, is inputted to the input terminal A1 of the comparator 74. Further, the check signal CB is inputted to the input terminal A2 of the comparator 74. The comparator 74 compares the cell block number D with the check signal CB and, if coincident with each other, outputs the signal of "1" as an output E3 from the output terminal E. This signal of "1" is inputted to an OR circuit 78, the OR circuit 79, and the AND circuit 82. Further, the comparator 74, if the cell block number D is greater by "1" than the check signal CB, the signal of "1" is inputted as an output G3 from the output terminal G to the OR circuit 78.

Note that the comparators 72–74 output the signals of "0" from the respective output terminals E or G if other than the above cases.

The OR circuit 76, if one of the outputs E1 and G1 received from the comparator 72 is the signal of "1", inputs a signal of "1" as an output F1 to the AND circuit 84. Furthermore, the OR circuit 77, if one of the outputs E2 and G2 received from the comparator 73 is the signal of "1", inputs a signal of "1" as an output F2 to the AND circuit 84. Moreover, the OR circuit 78, if one of the outputs E3 and G3 received from the comparator 74 is the signal of "1", inputs a signal of "1" as an output F3 to the AND circuit 84. Furthermore, the OR circuit 79, if one of the above outputs E1, E2 and E3 is the signal of "1", inputs a signal of "1" as an output F4 to the AND circuit 84.

The AND circuit 84, if all the outputs F1, F2, F3, F4 received respectively from the OR circuits 76–79 are "1", the signal of "1" is inputted as an output H to each of the AND circuits 80–82.

The above cell pulses CP1–CP3 are respectively inputted to the AND circuit 83. The AND circuit 83, if all the cell pulses CP1–CP3 are "1", the signal of "1" is inputted to each of the AND circuits 80–82.

The AND circuit 80, if all of the output E1 from the comparator 72, the output H from the AND circuit 84 and the output from the AND circuit 83 are "1", inputs, as an output S1, the signal of "1" to the receiving cell buffer unit 51*a* and the cell multiplexing unit 53. Further, the output Si is inputted also to the OR circuit 75.

The AND circuit 81, if all of the output E1 from the comparator 73, the output H from the AND circuit 84 and the output from the AND circuit 83 are "1", inputs, as an output S2, the signal of "1" to the receiving cell buffer unit 51*b* and the cell multiplexing unit 53. Further, the output S2 is inputted also to the OR circuit 75.

The AND circuit 82, if all of the output E1 from the comparator 74, the output H from the AND circuit 84 and the output from the AND circuit 83 are "1", inputs, as an output S3, the signal of "1" to the receiving cell buffer unit 51*a* and the cell multiplexing unit 53. Further, the output S3 is inputted also to the OR circuit 75.

Note that each of the AND circuits 80–83 outputs the signal of "0" if other than the above cases.

The OR circuit 75, if one of the signal S1 from the AND circuit 80, the signal S2 from the AND circuit 81 and the signal S3 from the AND circuit 82 is "1", inputs the signal of "1" to the 4-bit counter 71. The counter value of the 4-bit counter 71 is thereby incremented by "1".

Thus, the OR circuits 76–79 and the AND circuit 84 in the CBN check unit 53, operate when the cell S exists in the final stage of each of the receiving cell buffer units 51*a*–51*c*. Then, each of the AND circuits 80–82, if the check signal CB is coincident with the cell block number D, simultaneously supplies the signal of "1" to the relevant receiving cell buffer units 51*a*–51*c*. Each of the receiving cell buffer units 51*a*–51*c*, upon receiving the signal of "1" from the CBN check unit 52, substantially simultaneously transfers the cell S existing in the last stage to the cell multiplexing unit 53. A delay and a fluctuation of each cell S in the network system can be thereby obviated. Thereafter, the cell multiplexing unit 53 executes the processes.

If the signals of "1" are outputted from all of the AND circuits 80–82, this has such an implication that the three cells having the same cell block number D are prepared within the receiving cell buffer units 51*a*–51*c*. On the other hand, if the signal of "1" is not outputted from any one of the AND circuits 80–82, this implies that one of the three cells having the same cell block number D is lost.

Figure 20:
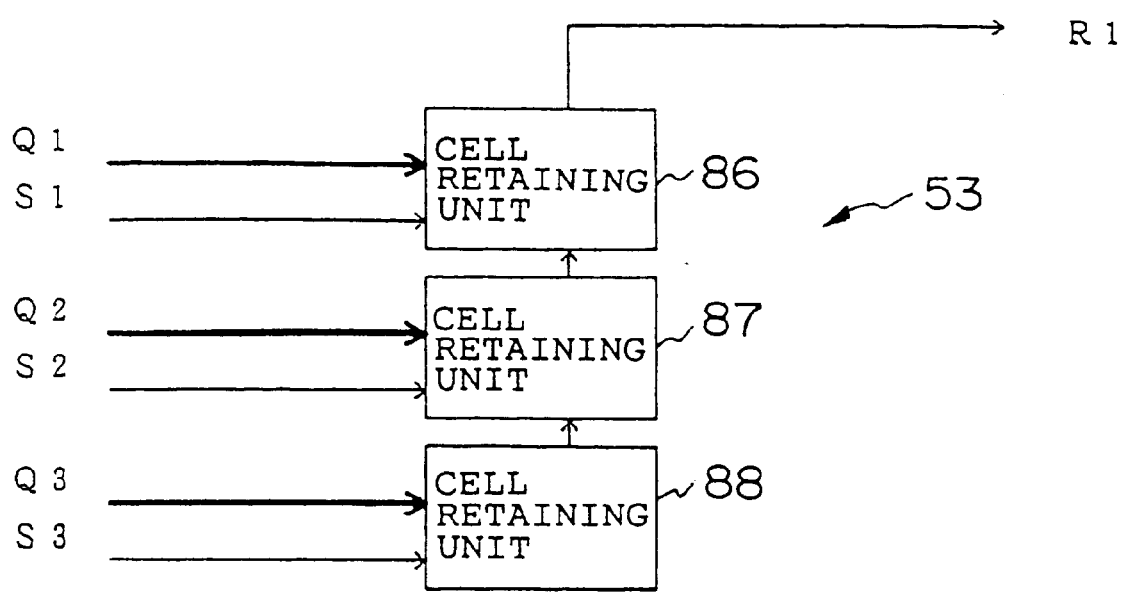
FIG. 20 is a diagram showing a construction of a cell multiplexing unit illustrated in FIG. 15.
Figure 21:
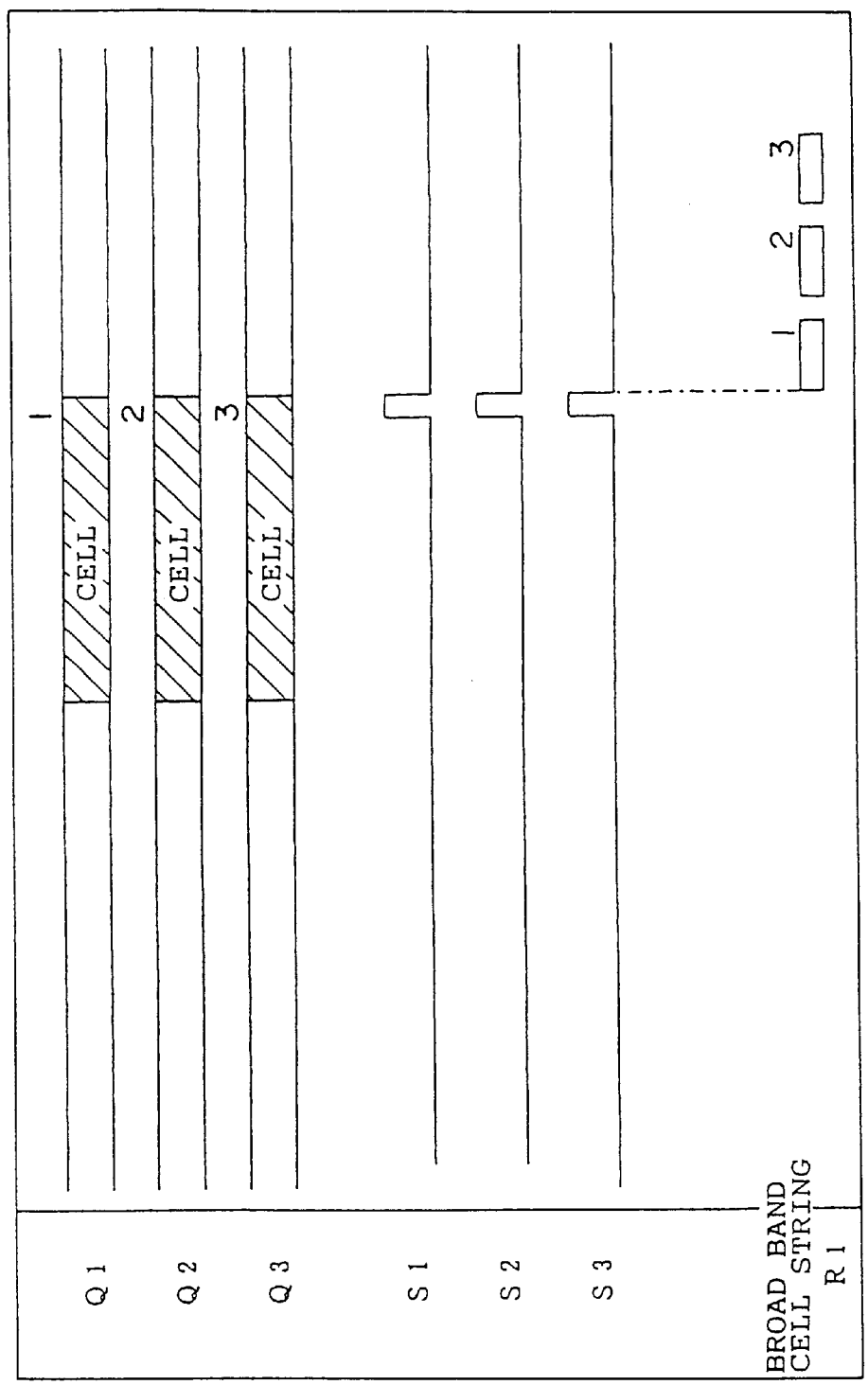
FIG. 21 is an explanatory diagram showing an operation of the CBN check unit illustrated in FIG. 20.

FIG. 20 is a diagram showing a construction of the cell multiplexing unit 53 illustrated in FIG. 15. FIG. 21 is an explanatory diagram showing an operation of the cell multiplexing unit 53 illustrated in FIG. 20. Referring to FIG. 20, the cell multiplexing unit 53 comprises three cell retaining units 86–88. The cell retaining unit 86 is connected to the receiving cell buffer unit 51*a*, the cell retaining unit 87 is connected to the receiving cell buffer unit 51*b*, and the cell retaining unit 88 is connected to the receiving cell buffer unit 51*c*.

The respective cell retaining units 86–88 retain the cells S transmitted from the receiving cell buffer units 51*a*–51*c* corresponding thereto. The output Si from the AND circuit 80 (see FIG. 18) of the CBN check unit 52 is inputted to the cell retaining unit 86, the output S2 from the AND circuit 81 is inputted to the cell retaining unit 87, and the output S3 from the AND circuit 82 is inputted to the cell retaining unit 88. These outputs S1–S3 are substantially simultaneously inputted to any one of the cell retaining units 86–88 corresponding thereto.

Thereupon, the cell multiplexing unit 53 generates a part of the broad band cell string by arranging the cells S retained respectively by the cell retaining units 86–88. That is, the cell multiplexing unit 53 arranges and outputs the cells S retained by the cell retaining units 86–88 in the order accordant with the line numbers of the low-speed lines α1–α3. The respective cells S outputted are transferred to the high-speed ATM network 12 via the high-speed line interface 33 shown in FIG. 1.

Figure 22:
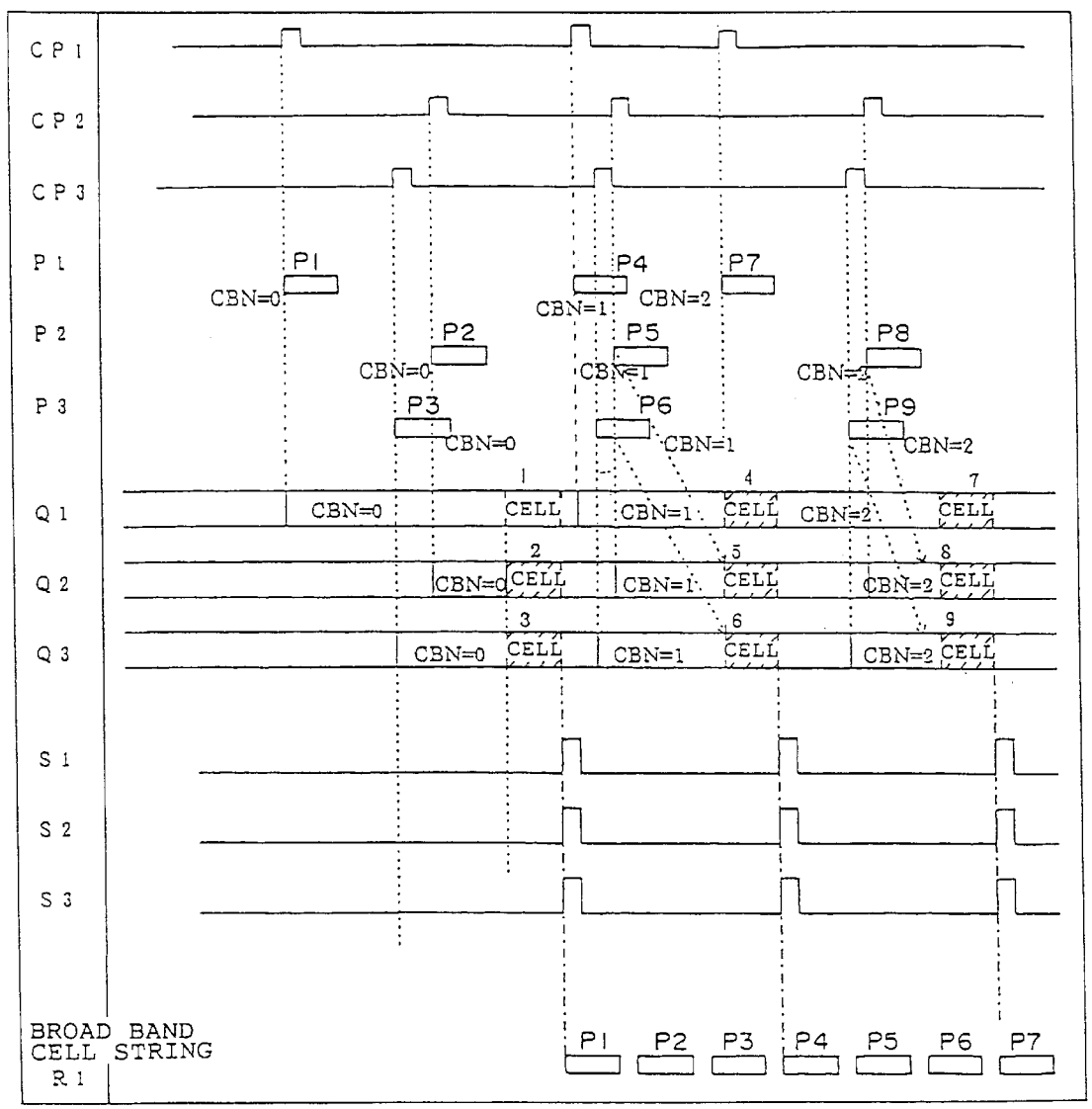
FIG. 22 is an explanatory diagram showing an operation of a receiving unit shown in FIG. 15.

FIG. 22 is an explanatory diagram showing the operation of the whole receiving unit 32 shown in FIG. 15. Referring to FIG. 22, there is shown an example of the operation of the receiving unit 32 in the following case. The cells P1, P4, P7 as the plurality of cells S forming the narrow band cell string are transmitted from the low-speed line interface 31a. Then, the cells P2, P5, P8 as the plurality of cells S forming the narrow band cell string are transmitted from the low-speed line interface 31b, and the cells P3, P6, P9 as the plurality of cells S forming the narrow band cell string are transmitted from the low-speed line interface 31c.

It is, however, assumed that the three narrow band cell strings transmitted respectively from the low-speed line interfaces 31a–31c are obtained such that the broad band cell string formed by arranging the cells PP9 in the order of P1, P2, P3, P4, P5, P6, P7, P8, P9 is demultiplexed into three strings by the band demultiplexer 20.

Each of the receiving cell buffer units 51a–51c shown in FIG. 15 is stored with any one of the cells P1–P9 transmitted from any one of the corresponding low-speed line interfaces 31a–31c. Subsequently, each of the receiving cell buffer units 51a–51c, when its own last stage is stored with any one of the cells P1–P9, inputs to the CBN check unit 52 the cell block number D stored in the GFC area 25 of this cell, and waits for a response from the CBN check unit 52.

At this time, it is presumed that the cells P1–P3 are received by one of the receiving cell buffer units 51a–51c corresponding in the order of, e.g., P1, P3, P2. In this case, to begin with, the cell block number D (e.g., CBN=0) of the cell P1 is inputted to the CBN check unit 52. Subsequently, the cell block number D (e.g., CBN=0) of the cell P3 is inputted to the CBN check unit 52. Then, the cell block number D (e.g., CBN=0) of the cell P2 is inputted to the CBN check unit 52.

Then, the CBN check unit 52 compares a counter value (a check signal CB) of the 4-bit counter 71 with each cell block number (CBN=0). At this time, if the counter value is a value indicating "0", each of the comparators 72–74 judges that the each cell block number D is coincident with the check signal CB. The signal of "1" outputted from the CBN check unit 52 is thereby substantially simultaneously inputted to the receiving cell buffer units 51a–51c, and to the cell retaining units 86–88 of the cell multiplexing unit 53.

With this processing, the cells P1–P3 existing in the final stages of the receiving cell buffer units 51a–51c, are substantially simultaneously transferred to the cell multiplexing unit 53, and respectively retained by the cell retaining units 86–88 corresponding thereto. Subsequently, the cells P1–P3 stored in the cell retaining units 86–88 are arranged in the order such as P1, P2, P3, and transferred sequentially to the high-speed line interface 33.

Thereafter, when any one of the cells P4–P6 is stored in each of the last stages of the receiving cell buffer units 51a–51c, the cell block number (CBN=1) of each of the cells P4–P6 is inputted to the CBN check unit 52. Thereupon, the CBN check unit 52, the receiving cell buffer units 51a–51c and the cell multiplexing unit 53 operate the same as the operations described above, and the cells P4–P6 are transferred in the order of P4, P5, P6 to the high-speed line interface 33.

Thereafter, the receiving unit 32 performs the above-described operation on the cells P7–P9 to which the same cell block number D (CBN=0) is added, and transfers the cells P7–P9 in the order of P7, P8, P9 to the high-speed line interface 33. Thus, the three narrow band cell strings are multiplexed, thereby restoring the single broad band cell string. At this time, the cell multiplexing process is executed based on the cell block number D added to each of the cells P1–P9 per cell block defined by the transmitting unit 22.

Therefore, the order of the cells S being received by the band multiplexer 30 changes due to a delay of the cell S that is caused in the low-speed ATM network 13, and an interval at which the band multiplexer 30 receives the cells S becomes different, in which case the broad band cell string can be restored in the order of being sent from the high-speed line interface 21 (see FIG. 1).

Further, eve if any one of the cells P1–P9 is lost (lacking) before the receiving unit 32 receives this cell, the receiving unit 32 multiplexes only the cells S having the same cell block number D.

Figure 23:
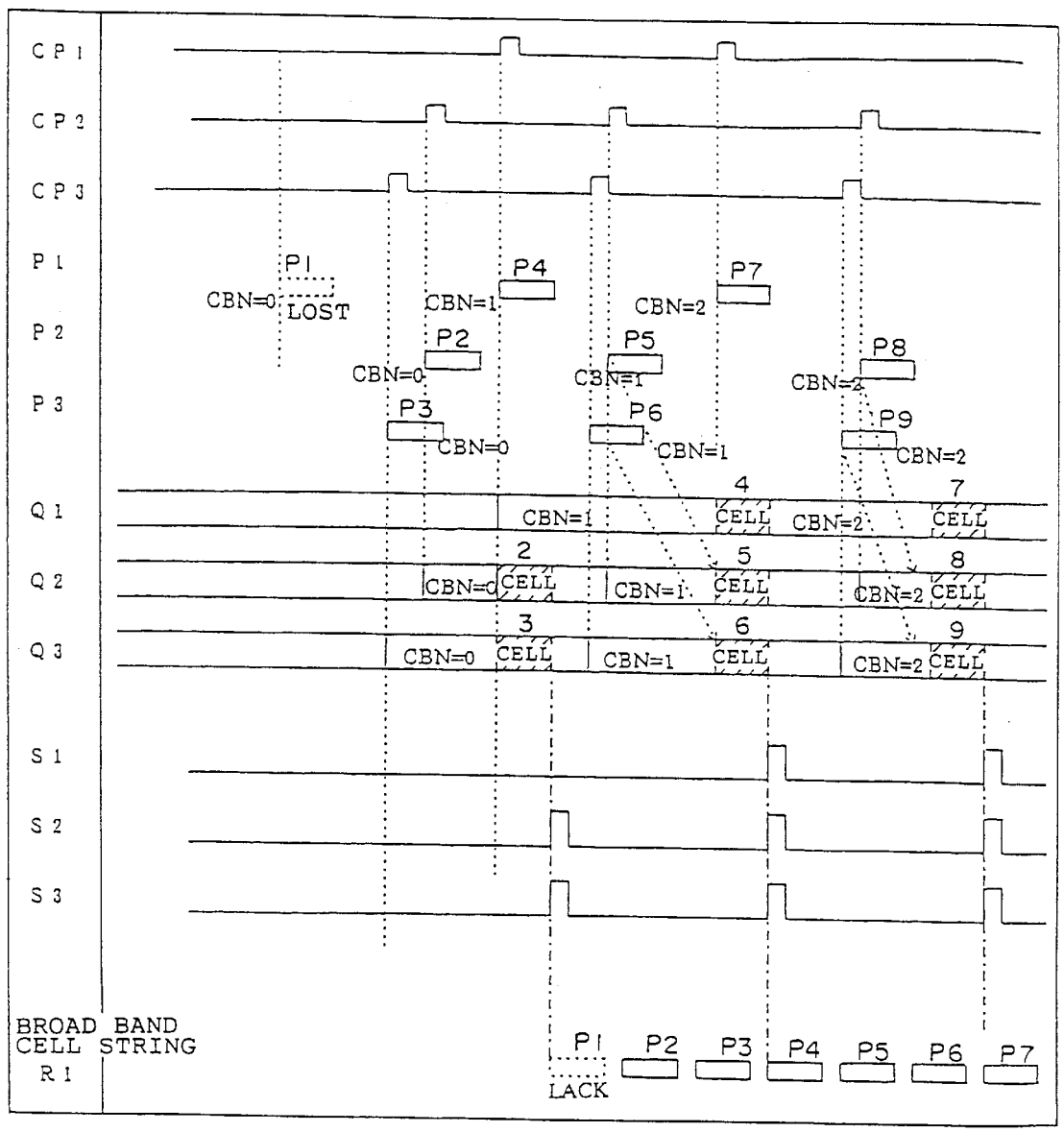
FIG. 23 is an explanatory diagram showing an operation of the receiving unit shown in FIG. 15.

It is assumed that, as shown in FIG. 23, e.g., the cell P1 among the cells P1–P9 in the example described above is lost in the low-speed ATM network 13. In this case, the cell P4 is at first stored in the last stage of the receiving cell buffer unit 51a of the receiving unit 32. Hence, the cell block number D (CBN=1) if the cell P4 is inputted to the CBN check unit 52.

Thereupon, the output G1 instead of the output E1 is outputted from the comparator 72 of the CBN check unit 52, and therefore the signal of "0" is outputted as the output Si from the AND circuit 80. Then, the signals of "1" are outputted as the outputs S2, S3 from the AND circuits 81, 82. Accordingly, what is transferred to the cell multiplexing unit 53 is not the cell P4 but only the cells P2, P3. Therefore, the cell multiplexing unit 53 executes the multiplexing process with the cell P2 and the cell P3.

Thereafter, if no cell is lost in the low-speed ATM network 13, the counter value of the 4-bit counter 71 is incremented by "1", and the cell P5 is stored in the last stage of the receiving cell buffer unit 51b while storing the last stage of the receiving cell buffer unit 51 with the cell P6. Then, the cell P4 is transferred together with the cells P5, P6 to the cell multiplexing unit 53, and the cell multiplexing unit 53 multiplexes the cells P4, P5, P6.

<Effects of Embodiment 1>

According to the network system in the embodiment 1, the band demultiplexer 20 demultiplexes the broad band cell string into the three narrow band cell strings, and transfer these narrow band strings to the three low-speed lines α1–α3. At this time, the transmitting unit 22 of the band demultiplexer 20 adds the same cell block number D per number of low-speed lines (N=3) to the plurality of cells S forming the broad band cell string.

Further, the band multiplexer 30 multiplexes the three narrow band cell strings transferred via the respective low-speed lines, thereby restoring the single broad band cell string. At this time, the receiving unit 32 of the band multiplexer 30 executed the multiplexing process on each of the cells marked with the same cell block number D on the basis of the cell block numbers D added respectively to the plurality of cells S structuring the three narrow band cell strings.

It therefore never happens that the order of the plurality of cells S structuring the broad band cell string does not become different on the side of the band demultiplexer 20 and on the side of the band multiplexer 30 in spite of the delay and the fluctuation of the cells S, which are produced in the low-speed ATM network 13. Accordingly, the plurality of cells S transmitted from any one of the DTEs 10a, 10b and 10c are received by the DTE 10d or 10e in the order of being transmitted. Hence, the data communications can be properly conducted between the DTEs.

Further, the GFC area 25 defined as a free area of the cells S is stored with the cell block number D, and hence there is no necessity for forming a new area in the header H1 and in the payload PL1 of the cell S. That is, the standard cells S can be used in the network system in the embodiment 1.

Moreover, the procedures of the data communications can be more simplified than by the prior art because of no necessity for transmitting the training cells as in the prior art network system.

[Embodiment 2]

Figure 24:
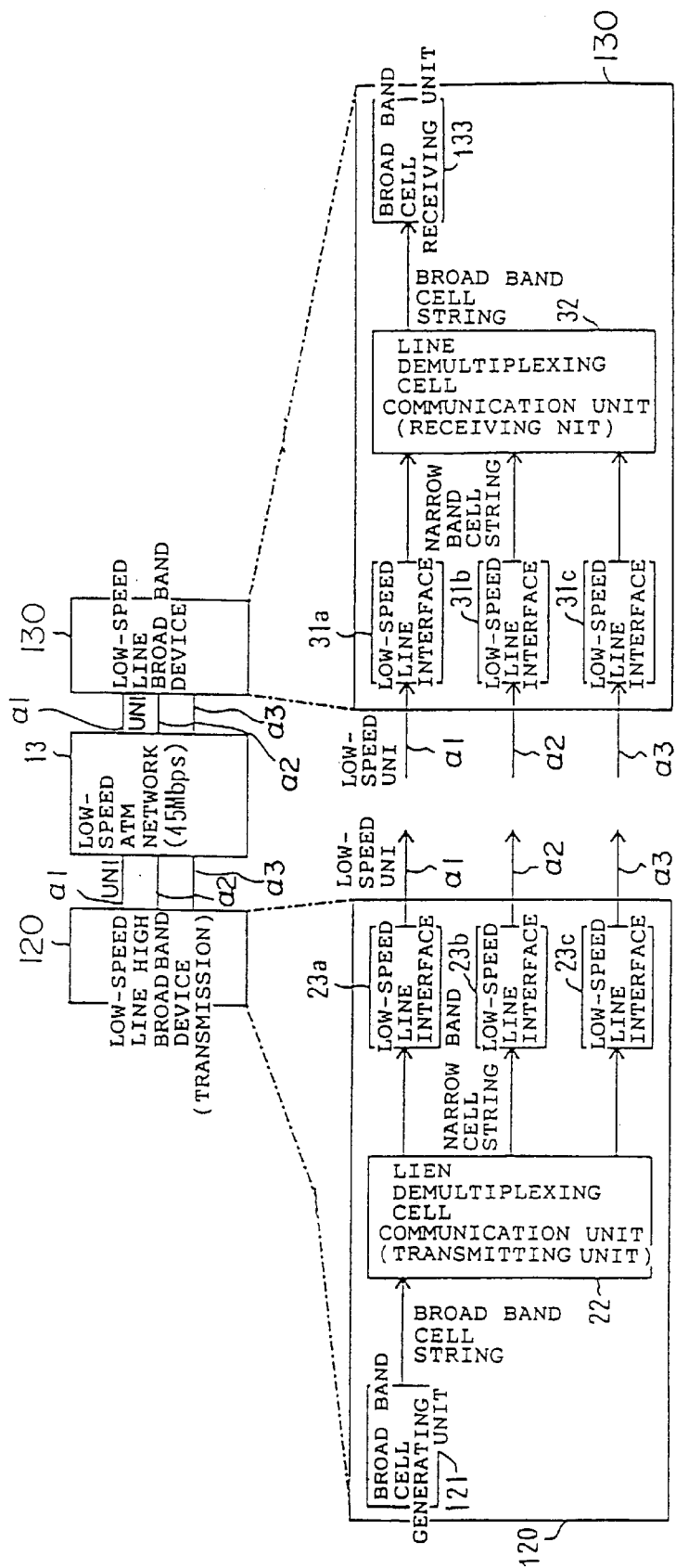
FIG. 24 is a diagram illustrating a construction of the network system in an embodiment 2.
Figure 25:
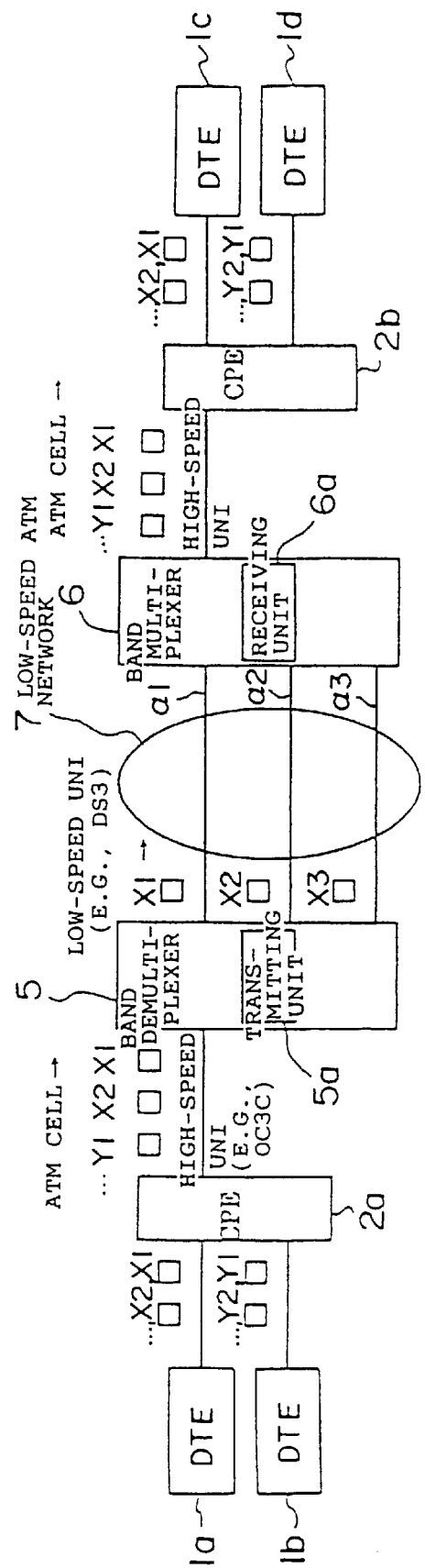
FIG. 25 is an explanatory diagram of the prior art.
Figure 26:
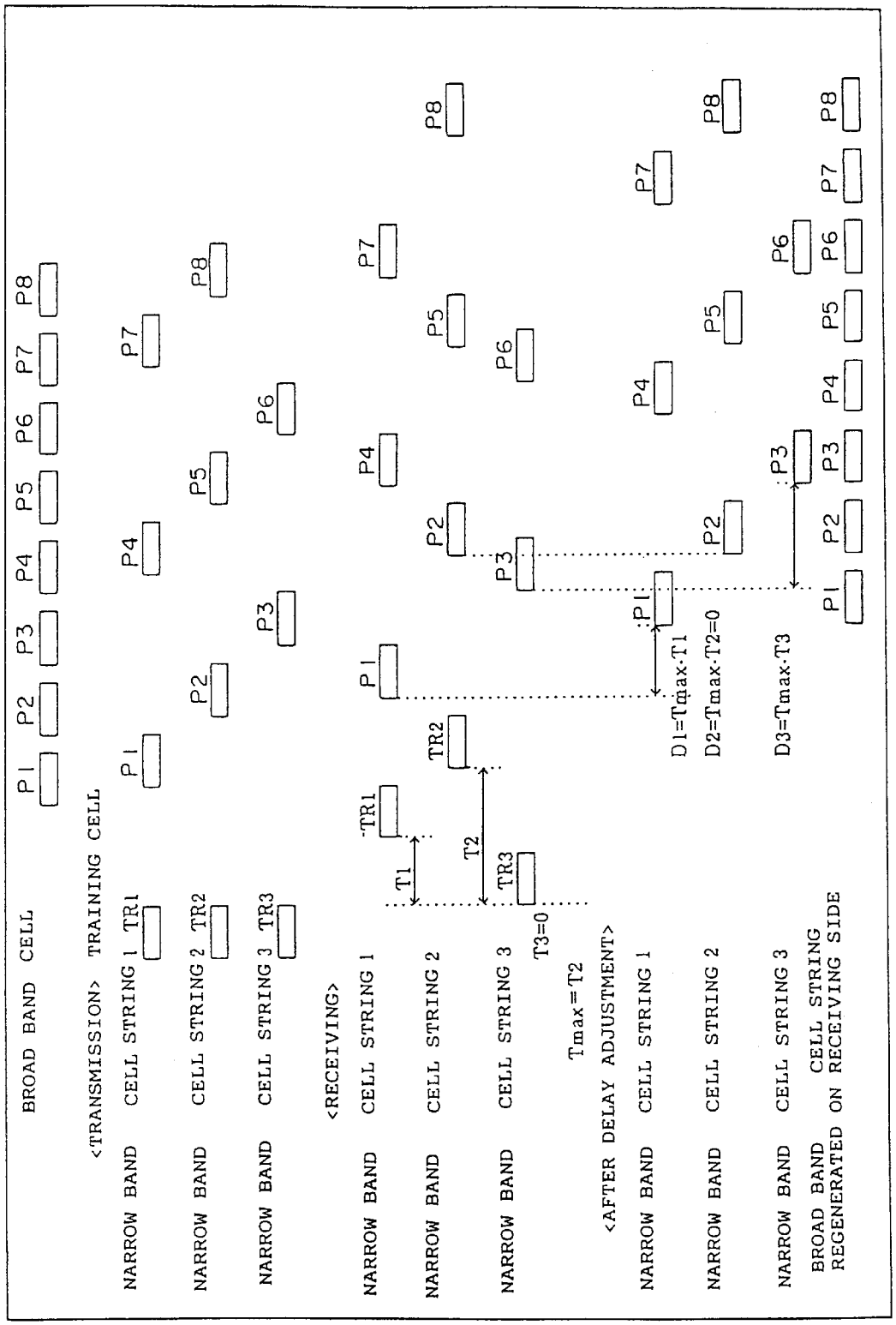
FIG. 26 is an explanatory diagram of the prior art.

Next, the network system in an embodiment 2 of the present invention will be explained. FIG. 24 is a diagram illustrating a construction of the whole network system in the embodiment 2. The network system in the embodiment 2 has substantially the same construction as the network system in the embodiment 11 and hence the common components are provided with the same numerals but with no repetitive explanation thereof. The explanation concentrates on only different configurations.

Referring to FIG. 24, the network system is constructed by connecting a low-speed line broad band device (a transmitting device) 120 to a low-speed line broad band device (a receiving device) 130 through the low-speed ATM network 13 including the three low-speed lines α1–α3. Namely, in the network system in accordance with the embodiment 2, the transmitting device 120 and the receiving device 130 constitute a terminal equipment in the network system.

The transmitting device 120 has substantially the same construction as the band demultiplexer 20 shown in FIG. 1, and includes a high band width cell generating 20 unit 121 as a substitute for the light-speed line interface 21 shown in FIG. 1. The broad band cell generating unit 121 transmits the above broad band cell string in response to a request from, e.g., a user.

The receiving device 130 has substantially the same construction as the band multiplexer 30 illustrated in FIG. 1, and includes a broad band cell receiving unit 133 as a substitute for the high-speed line interface 33 shown in FIG. 1. The broad band cell receiving unit 133 receives a broad band cell string transmitted from the receiving unit 32.

The construction other than explained so far is the same as that in the network system in the embodiment 1. Then, the operations of the network system are substantially the same as those of the network system in the embodiment 1, excluding such points that the broad band cell generating unit 121 replacing the DTEs 10a≧10c transmits the plurality of cells S forming the broad band cell string, and that the broad band cell receiving unit 133 replacing the DTE 10d or 10e receives the plurality of cells S.

The effects in the embodiment 2 are substantially the same as those in the embodiment 1. Note that in the network system in the embodiment 1, there may be connected the transmitting device 120 in place of the band demultiplexer 20, the high-speed ATM network 11, the CPEs 14a, 14b and the DTEs 10l–10c. Further, in the network system in the embodiment 1, there may be connected the receiving device 130 in place of the band multiplexer 30, the high-speed ATM network 12, the CPEs 14c, 14d and the DTEs 10d, 10e.

[Embodiment 3]

Next, an embodiment 3 of the present invention will be discussed. The embodiment 3 is, however, substantially the same as the embodiments 1 and 2, and therefore only a different point is explained. The CBN generating unit 43 and the CBN adding units 44a–44c in the embodiments 1 and 2, add the same cell block number to each of the cells S distributed to the plurality of low-speed lines α1–α3 at the same cycle.

By contrast, the CBN generating unit 43 of the transmitting unit 22 in accordance with the embodiment 3 uses, in place of the cell block number, the order of the cells forming the single broad band cell string as data (order data) about the order of the plurality of cells S structuring the broad band cell string. Moreover, the CBN adding units 44a–44c add the order data to the header Hi of each cell S transmitted from the transmitting unit 22. Accordingly, the order data, unlike the embodiments 1 and 2, are not absolutely related to a cycle at which to distribute the cells S to the plurality of low-speed lines α1–α3.

That is, in the band demultiplexer 20 (see FIGS. 1 and 24), the order in the broad band cell string is added to each of the headers Hi of the plurality of cells S structuring the broad band cell string, and the plurality of cells S forming the broad band cell string are demultiplexed into three narrow band cell strings. Then, each low band width cell string is transmitted via any one of the low-speed lines α1–α3 corresponding thereto.

The band multiplexer 30 multiplexes the cells S based on the order data loaded with the headers H1 of the respective cells S structuring the three narrow band cell strings, and the three narrow band cell strings are restored into the single broad band cell string.

According to the embodiment 3, by way of the data bout the order of the cells S, the order of the respective cells S in the high band width cell string is used as it is for restoring the broad band cell string. Therefore, the constructions of the CBN generating unit 43 of the band width demultiplexer 20 and the CBN check unit 52 of the band multiplexer 30 can be more simplified than in the embodiments 1 and 2.

It is apparent that, in this invention, a wide range of different working modes can be formed based on the invention without deviating from the spirit and scope of the invention. This invention is not restricted by its specific working modes except being limited by the appended claims.

What is claimed is:

1. A network system comprising:

a transmitting device, connected to a plurality of lines, cyclically distributing a plurality of cells to the lines in predetermined order, while loading a same cell block number into cells to be distributed to the lines in a same cycle; and a receiving device, connected to said transmitting device via the lines, receiving the cells transmitted from the transmitting device via the lines, and arranging the cells having the same cell block number in the predetermined order.

2. A network system comprising:

a first node connected to a first line and a plurality of second lines and including a generating unit generating a cell block number (CBN) which comprises data about the order of cells constituting a cell string received from the first line, a setting unit loading the CBN generated by said generating unit into the cells and a distributing unit distributing the cells loaded with the CBN by said setting unit to the second lines; and a second node connected to the first node via the second lines, connected to a third line, and including an arranging unit generating one cell string by arranging the cells received from the first node via the second lines on the basis of the CBN and by multiplexing the cells and a transmitting unit transmitting the cell string generated by said arranging unit to the third line.

3. A transmitting device connected via a plurality of lines to a receiving device which extracts cells having a same cell block number among a plurality of cells received via the lines from the transmitting device and arranges the cells in predetermined order, comprising:

a distributing unit cyclically distributing a plurality of cells to the lines in the predetermined order; and a loading unit loading a same cell block number into cells to be distributed to the lines in a same cycle.

4. A transmitting device according to claim 3, wherein the cell block number is stored into a generic flow control area of a header of the cells.

5. A transmitting device according to claim 3, further comprising a cell generating unit for generating the plurality of cells.

6. A transmitting device according to claim 3, wherein said distributing unit comprises:

a selector distributing the plurality of cells to the plurality of lines in accordance with a switching signal; and a switching control unit cyclically supplying the selector with the switching signal, and wherein said loading unit comprises:

a block number generating unit generating the cell block number corresponding to the switching signal; and a block number adding unit receiving the cell block number from the block number generating unit and loading the same cell block number into cells to be distributed in the same cycle.

7. A transmitting device for distributing a plurality of cells contained in a cell string received via a first line to a plurality of second lines, comprising:

a generating unit generating a cell block number (CBN) which comprises data about the order of the cells contained in the cell string;

a setting unit loading the CBN generated by said generating unit into the cells; and a distributing unit distributting the cells loaded with the CBN by said setting unit to the second lines.

8. A receiving device connected via a plurality of lines to a transmitting device which cyclically distributes a plurality of cells to the lines in predetermined order while loading a same cell block number into cells to be distributed to the lines in a same cycle, and which transmits the cells loaded with the cell block number to the lines, comprising:

a receiving unit receiving the cells from said transmitting device via the lines; and an arranging unit arranging the cells having a same cell block number among a plurality of cells received by the receiving unit in the predetermined order.

9. A receiving device according to claim 8, wherein if all the cells into which the same cell block number is loaded are not received, only received cells into which the same cell block number is loaded are arranged in the predetermined order.

10. A receiving device according to claim 8, further comprising:

a cell retaining unit storing the cells transferred via the lines;

a cell multiplexing unit fetching the cells having the same cell block number from said cell retaining unit, while arranging the cells in the predetermined order; and a block number checking unit checking the cell block number of the cells stored in said cell retaining unit, and makes said cell multiplexing unit fetch the cells having the same cell block number from said cell retaining unit.

11. A receiving device comprising:

an receiving unit receiving a plurality of cells via a plurality of first lines;

a arranging unit generating one cell string by arranging the cells on the basis of a cell block number (CBN) which comprises data about the order of the cells constituting said cell string while by multiplexing the cells; and a transmitting unit transmitting the cell string arranged by said arranging unit to a second line.

* * * * *